(No Model.)  18 Sheets—Sheet 4.
J. A. GROEBLI.
CARD PUNCHING MACHINE.
No. 551,544. Patented Dec. 17, 1895.
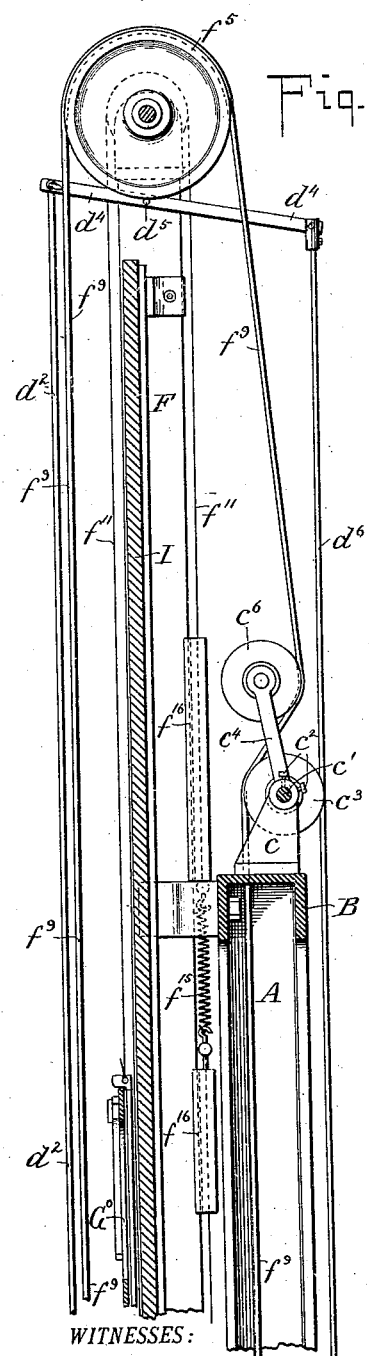
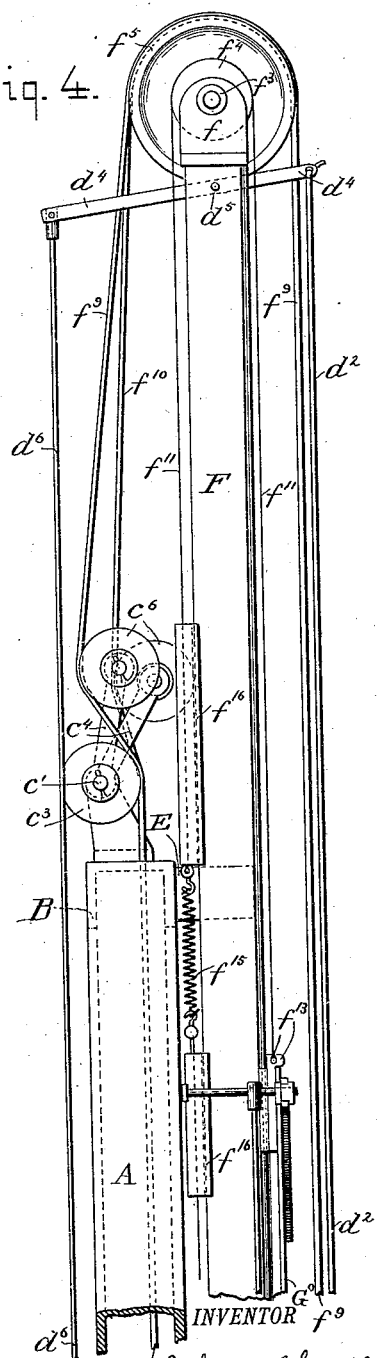

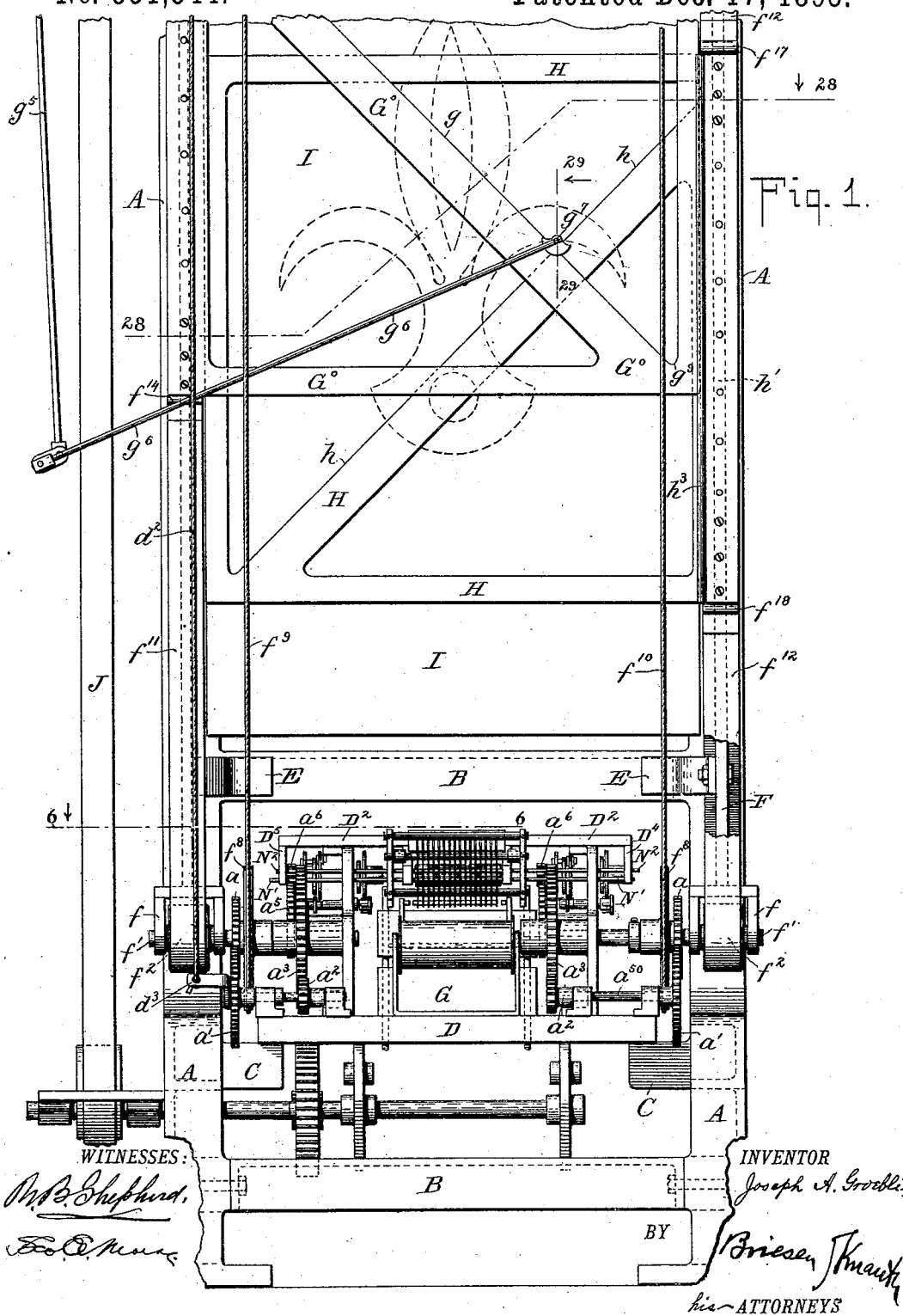

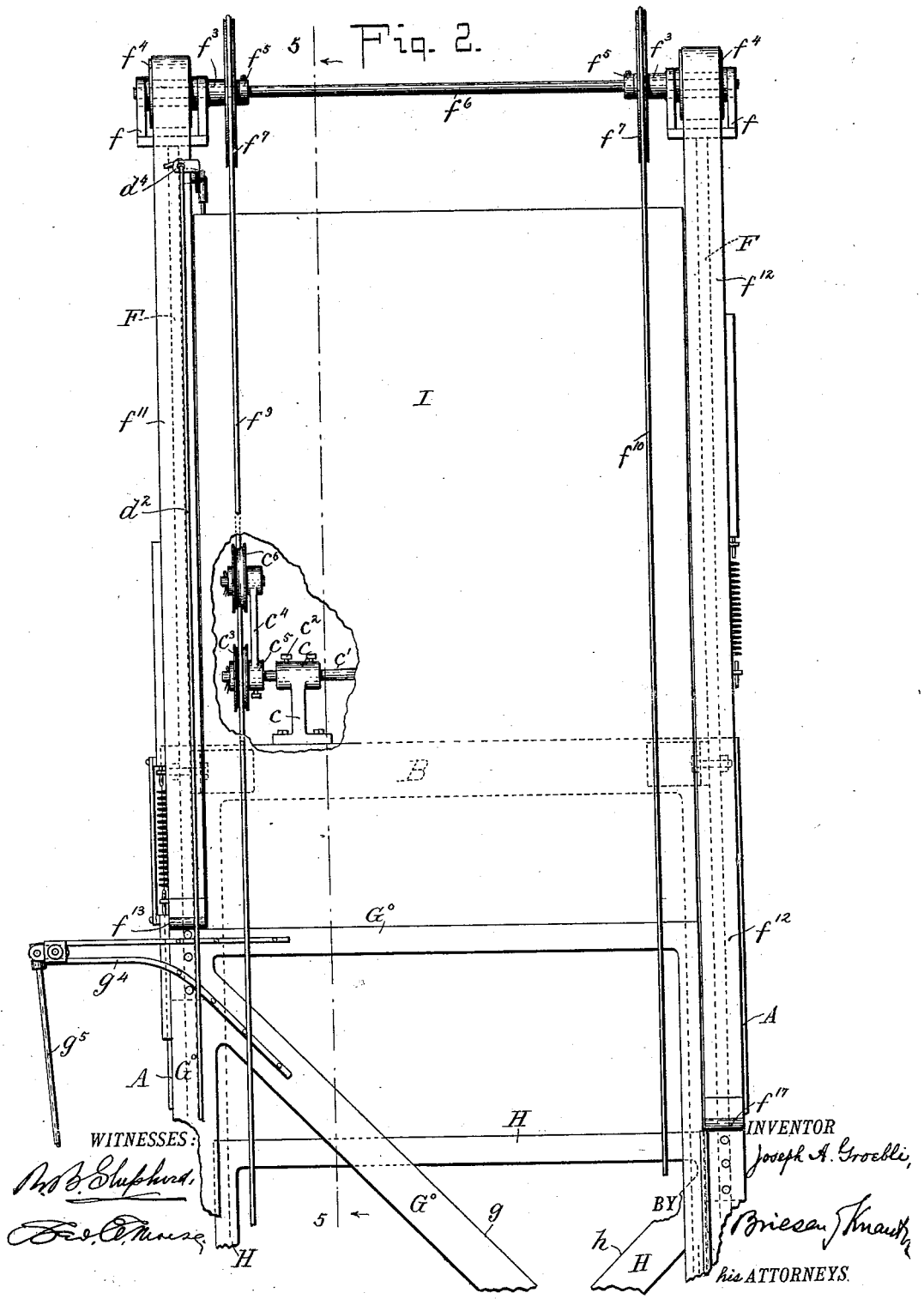

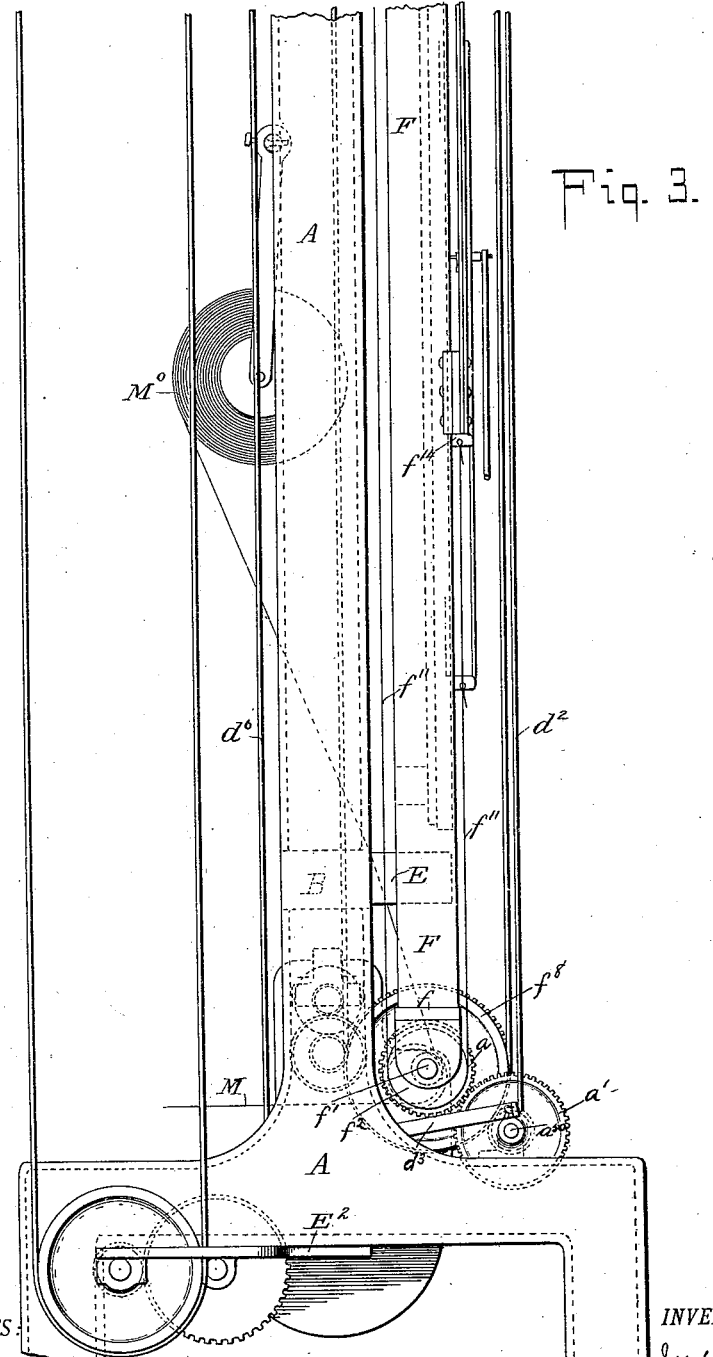

(No Model.) 18 Sheets—Sheet 5.
J. A. GROEBLI.
CARD PUNCHING MACHINE.
No. 551,544. Patented Dec. 17, 1895.
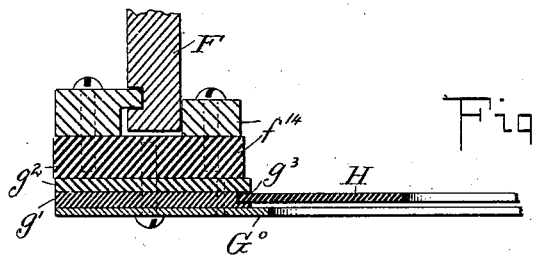
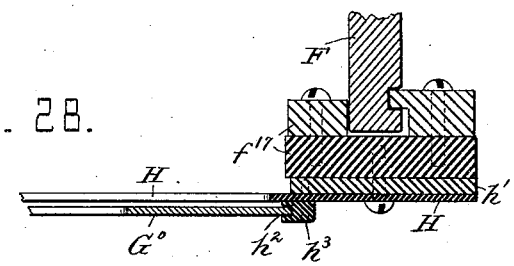
Fig. 28.
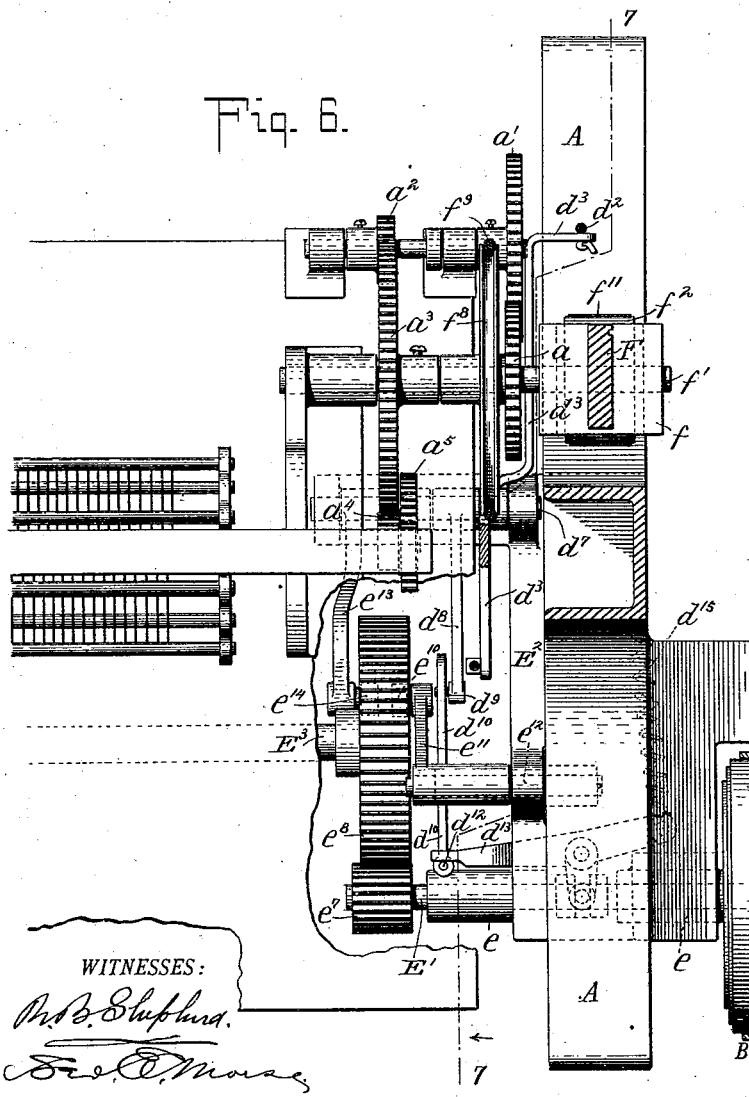
Fig. 6.
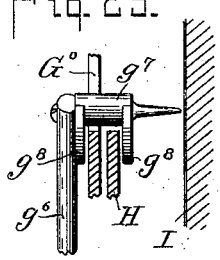
Fig. 29.
WITNESSES:
Chs. B. Shepherd.
Fred C. Morse
INVENTOR
Joseph A. Groebli,
BY Briesen Knauth
his ATTORNEYS.

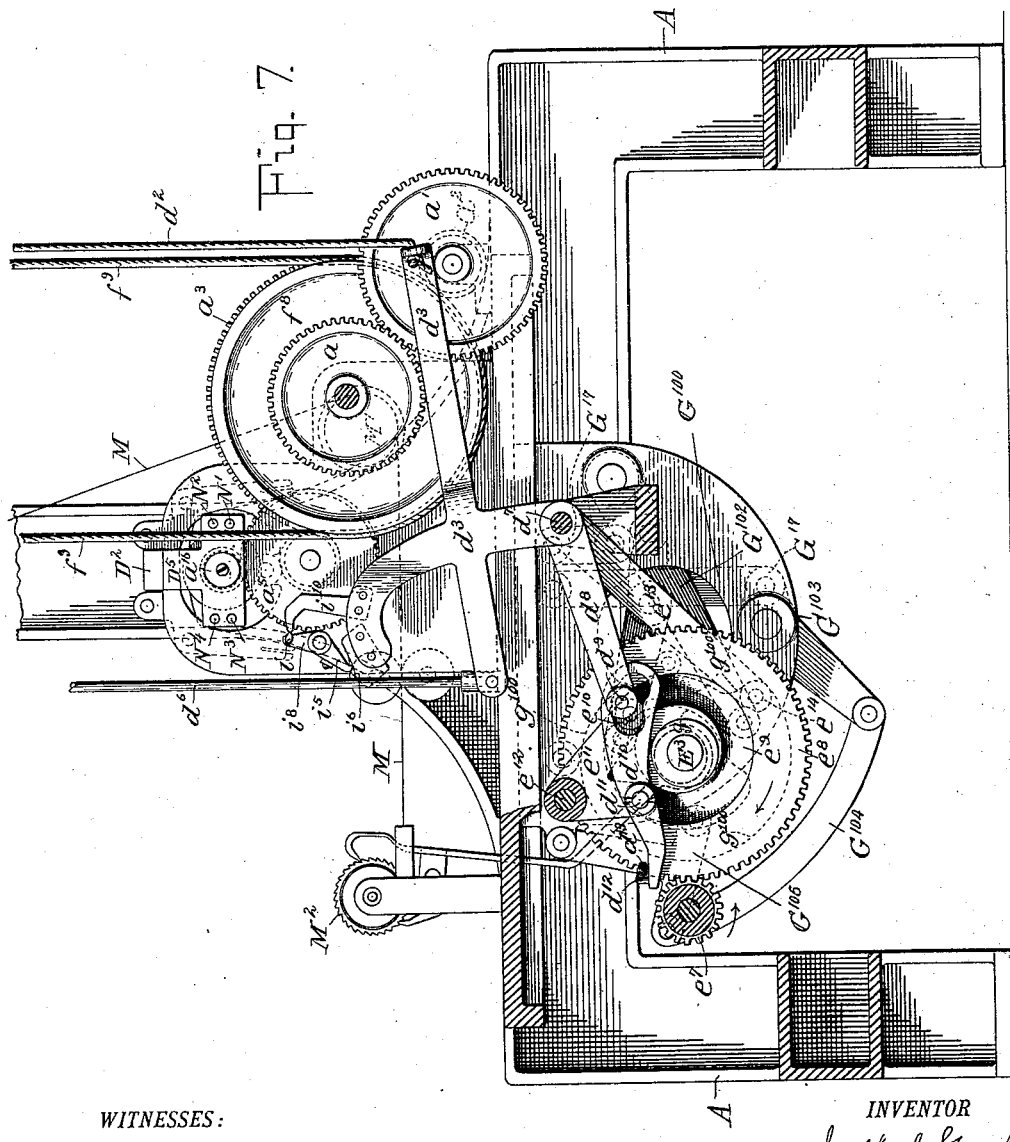

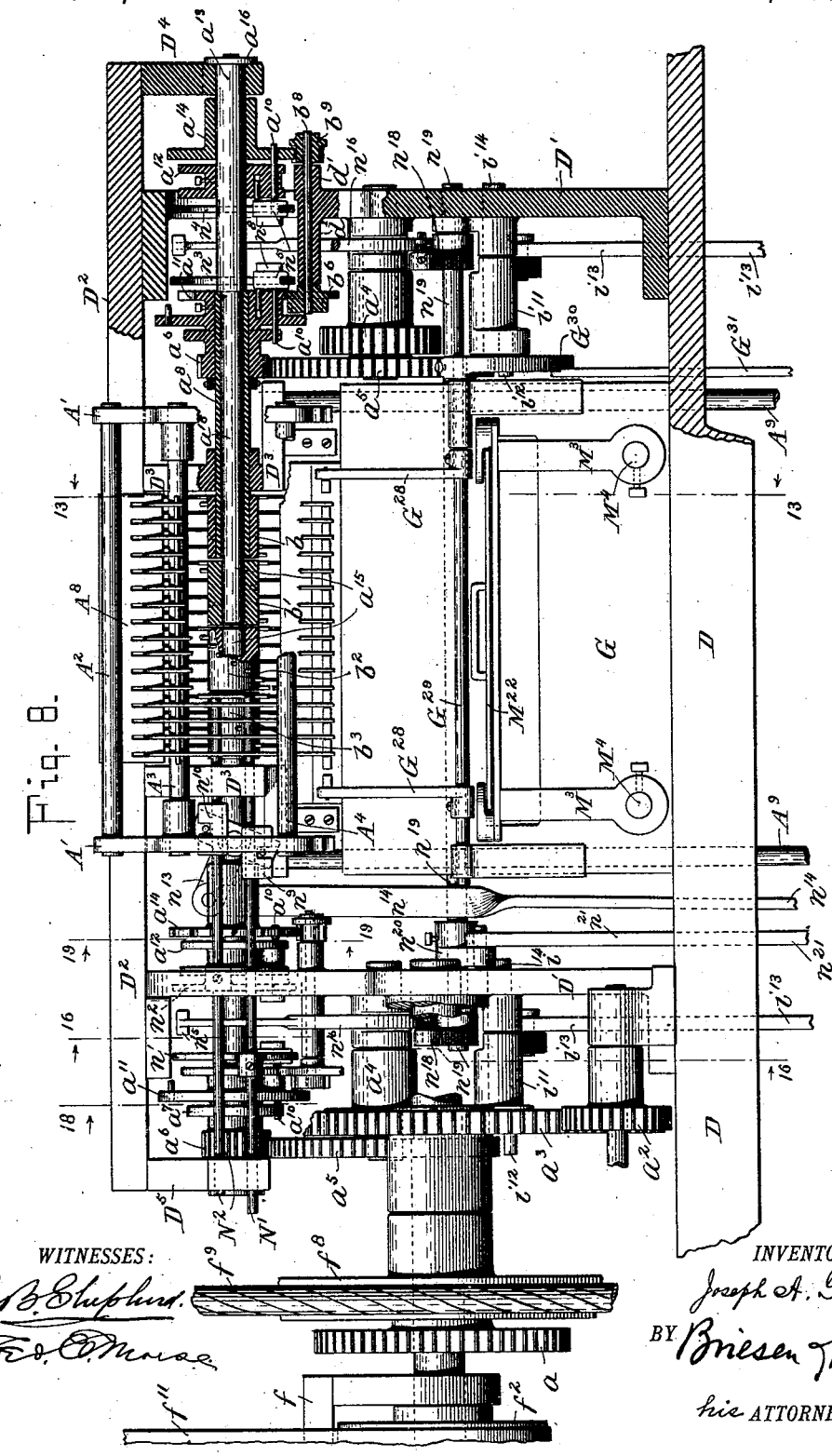

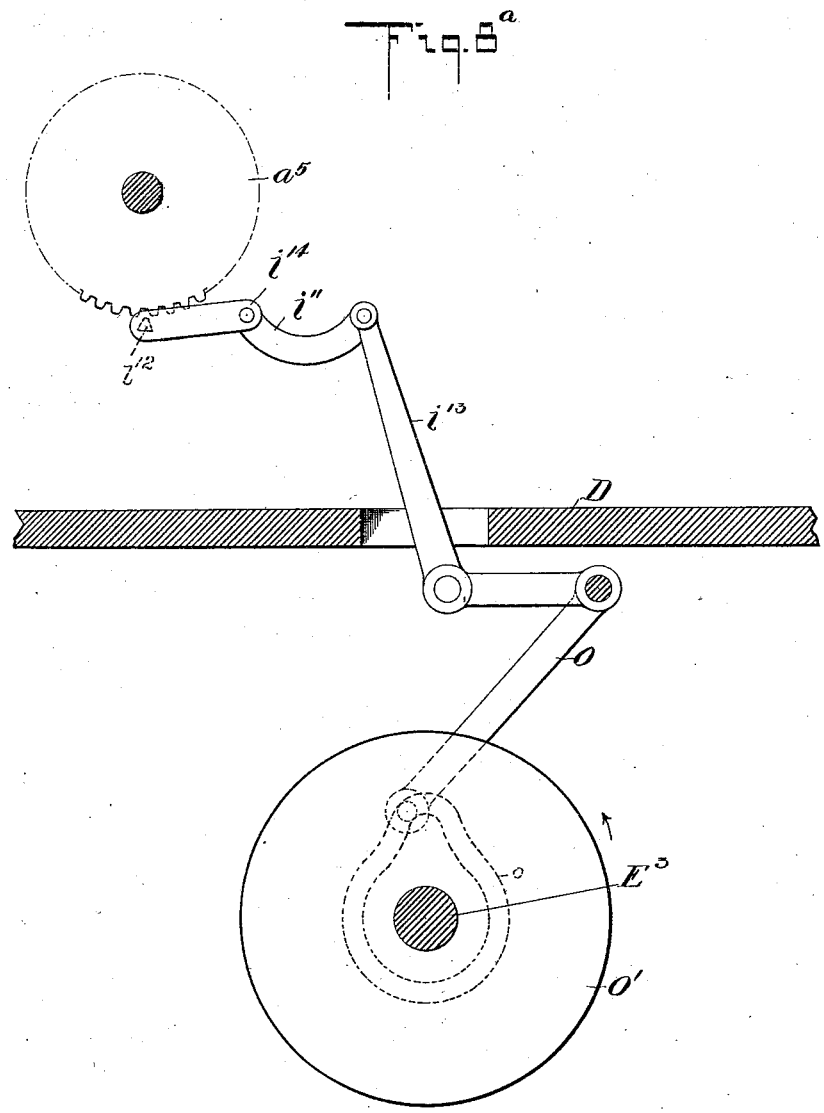

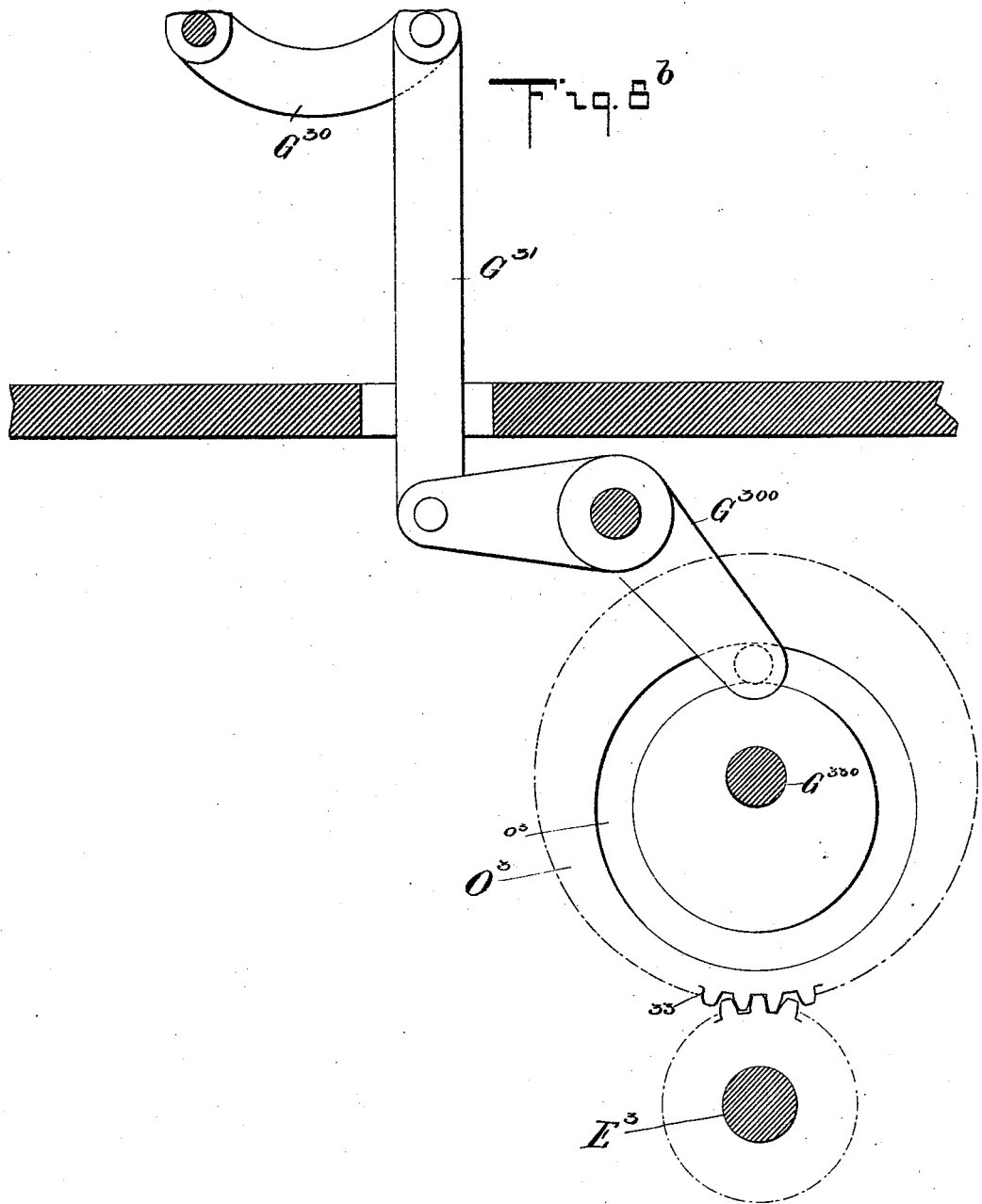

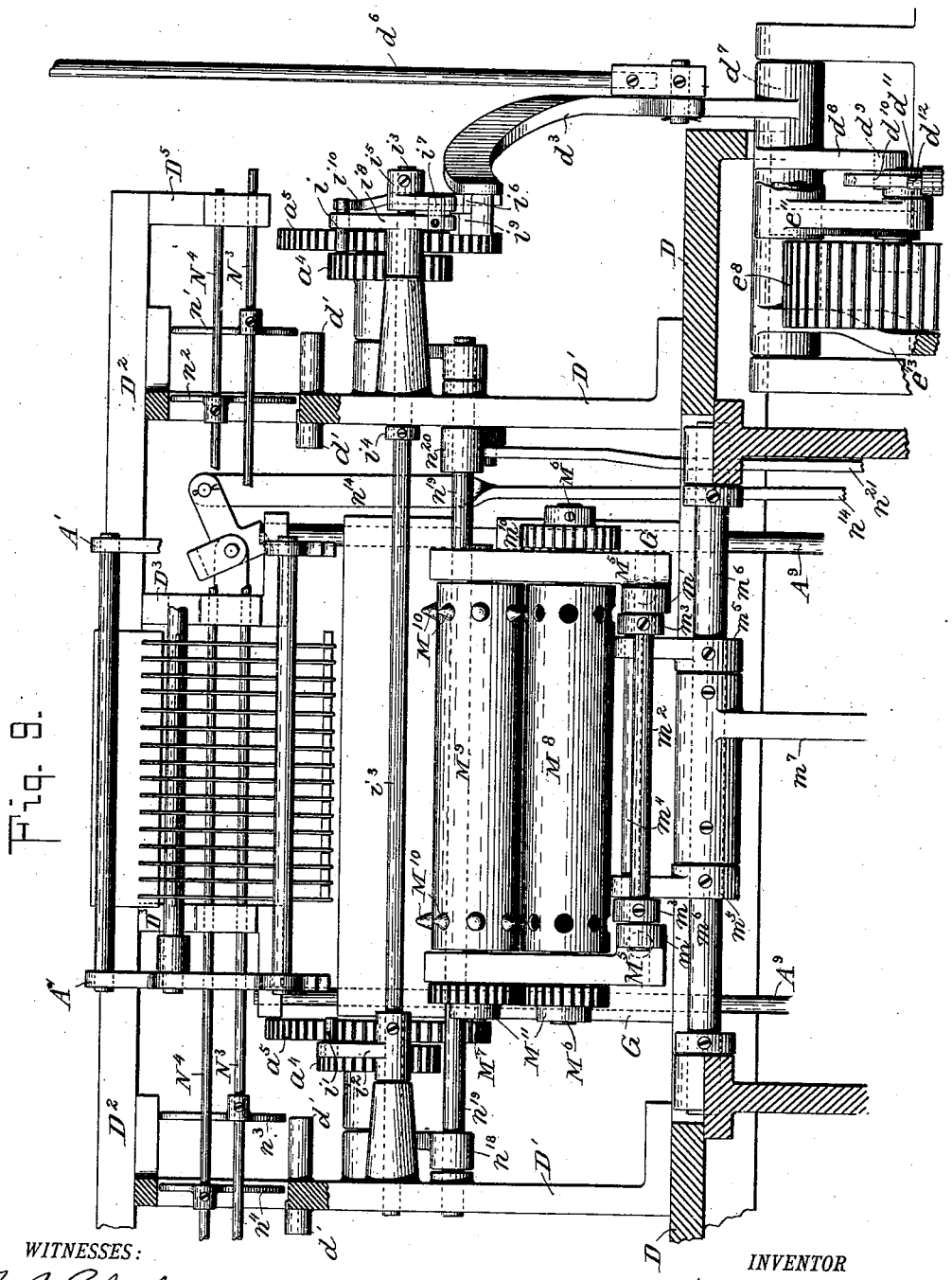

(No Model.)
18 Sheets—Sheet 11.
J. A. GROEBLI.
CARD PUNCHING MACHINE.
No. 551,544.
Patented Dec. 17, 1895.
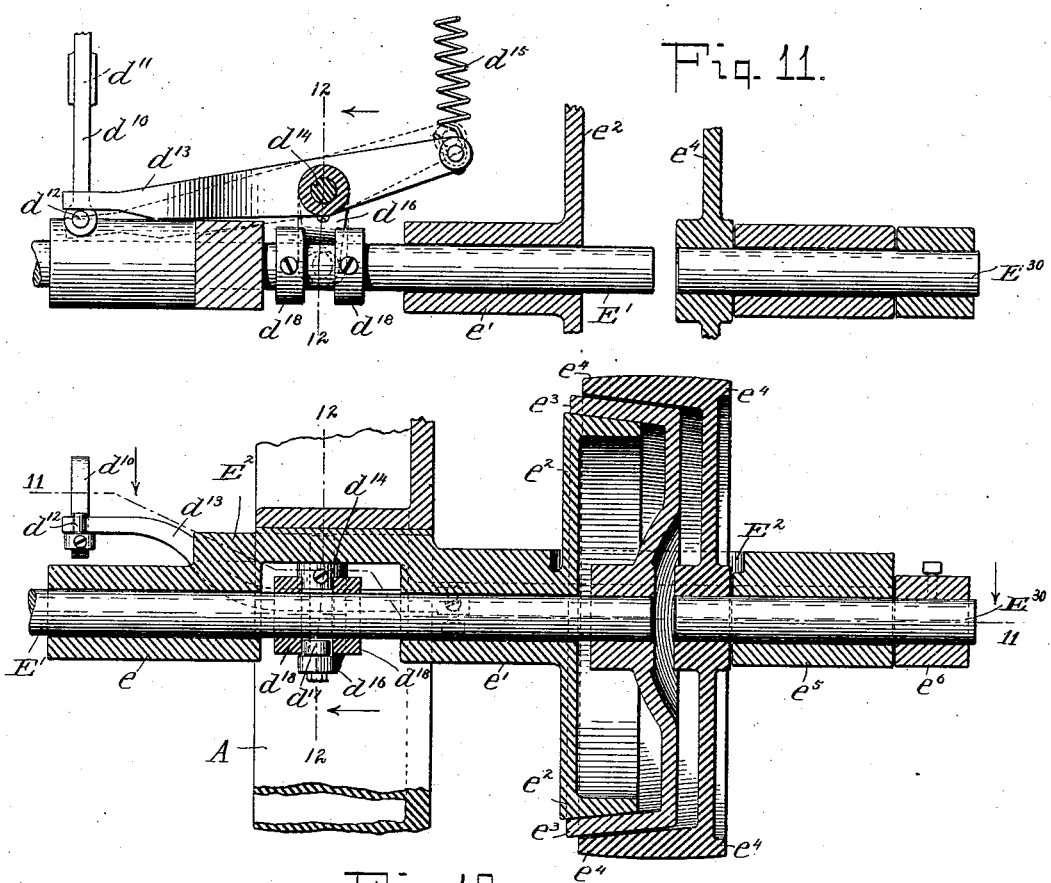
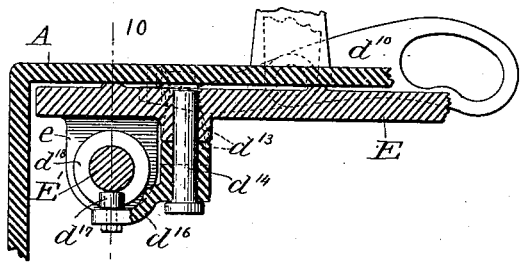
WITNESSES:
INVENTOR
Joseph A. Groebli,
BY Briesen & Knauth
his ATTORNEYS.

(No Model.) 18 Sheets—Sheet 12.

J. A. GROEBLI.
CARD PUNCHING MACHINE.

No. 551,544. Patented Dec. 17, 1895.

WITNESSES:
R. B. Shepherd.
Geo. A. Morse.

INVENTOR
Joseph A. Groebli,
BY Briesen & Knauth
his ATTORNEYS.

Figure 13:
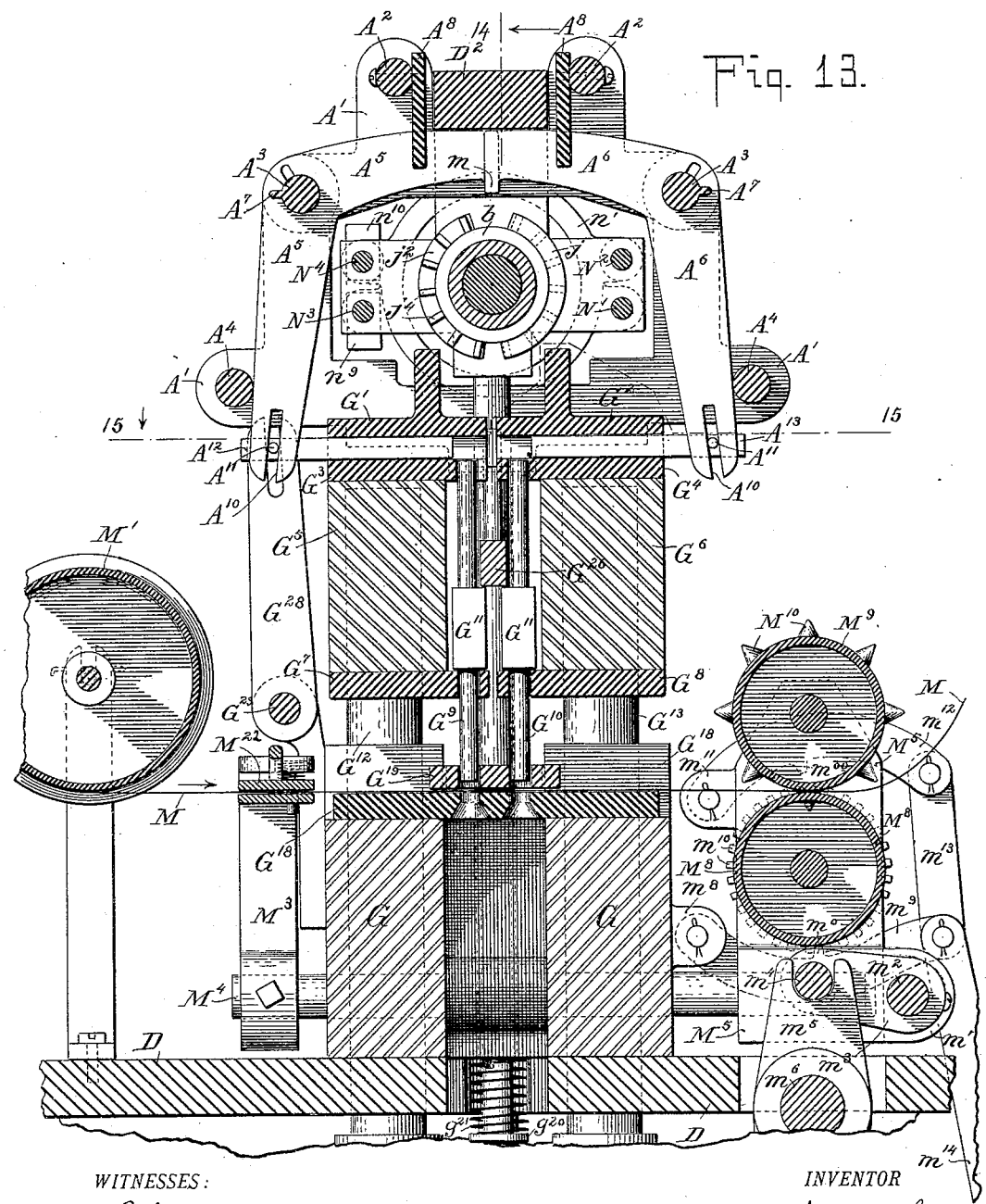

(No Model.)
18 Sheets—Sheet 13.
J. A. GROEBLI.
CARD PUNCHING MACHINE.
No. 551,544. Patented Dec. 17, 1895.
Fig. 13$^a$
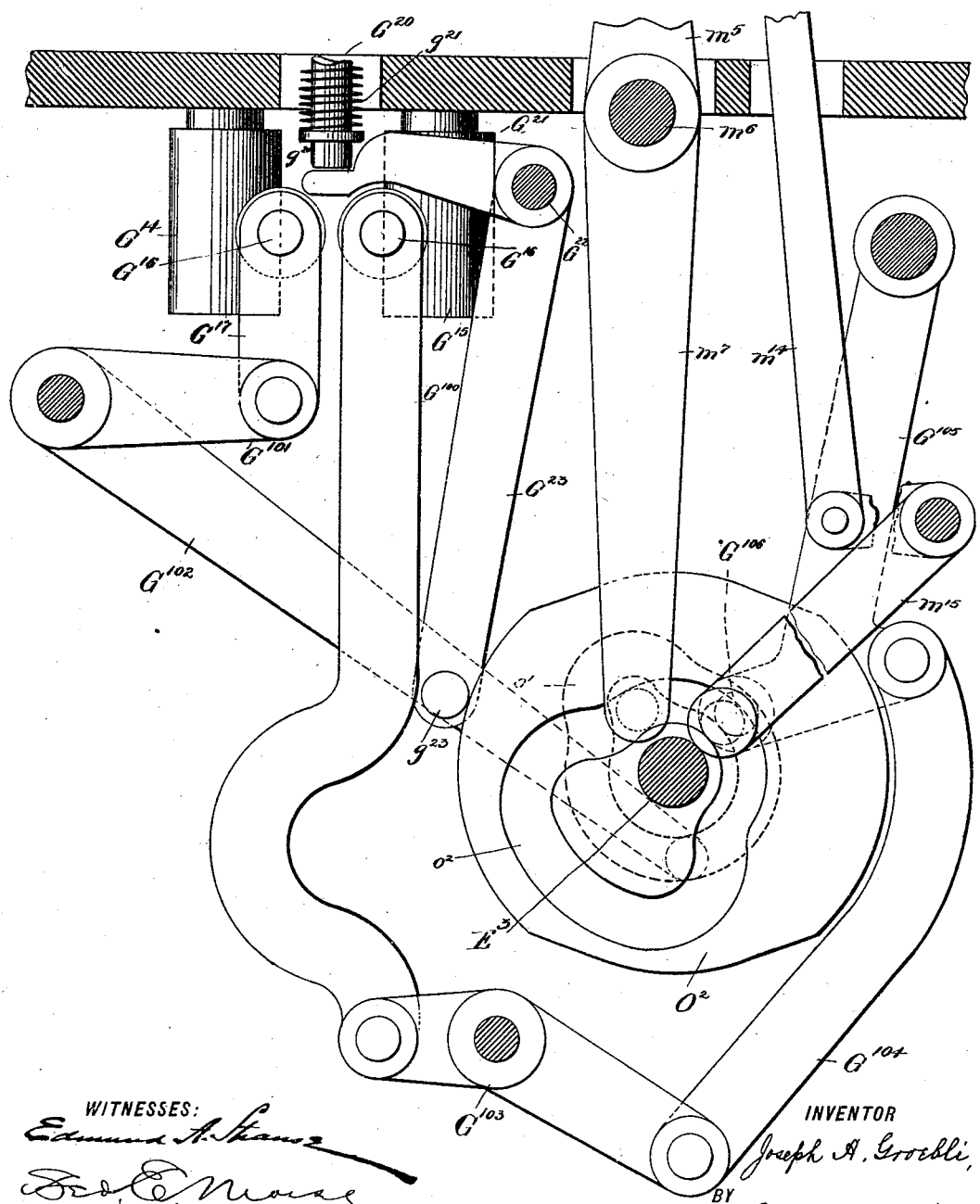
WITNESSES:
Edmund A. Strauss
Fred E. Morse
INVENTOR
Joseph A. Groebli,
BY Briesen & Knauth
his ATTORNEYS (No Model.) 18 Sheets—Sheet 14.

J. A. GROEBLI.
CARD PUNCHING MACHINE.

No. 551,544. Patented Dec. 17, 1895.

WITNESSES:
INVENTOR
Joseph A. Groebli,
BY Briesen & Knauth
his ATTORNEYS.

(No Model.)  18 Sheets—Sheet 15.
J. A. GROEBLI.
CARD PUNCHING MACHINE.

No. 551,544.  Patented Dec. 17, 1895.

WITNESSES:

INVENTOR
Joseph A. Groebli,
BY Briesen & Knauth
his ATTORNEYS.

(No Model.)   18 Sheets—Sheet 16.
J. A. GROEBLI.
CARD PUNCHING MACHINE.
No. 551,544.  Patented Dec. 17, 1895.
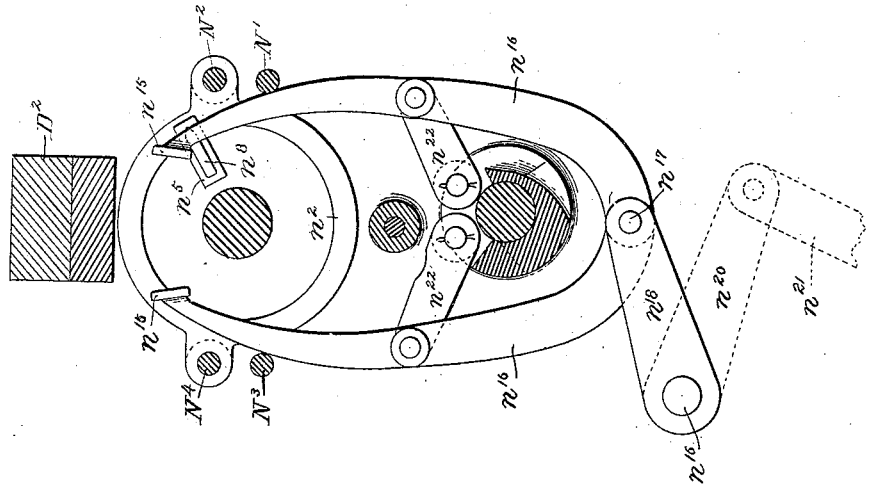
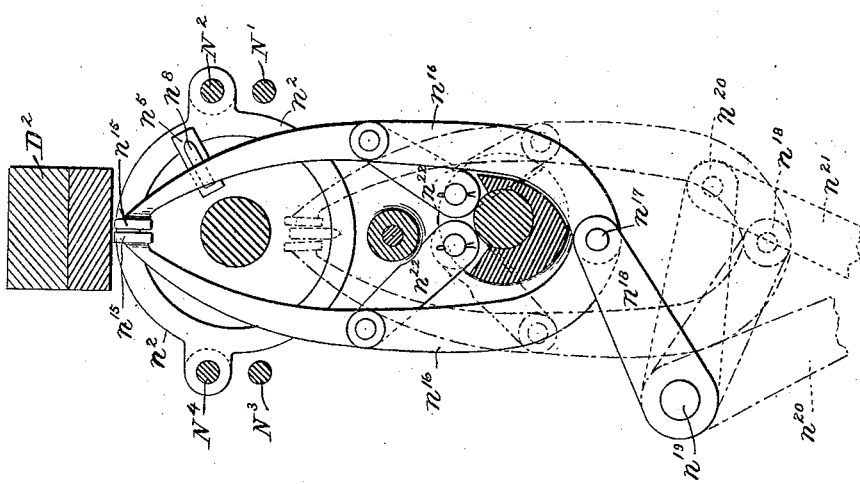
WITNESSES:
INVENTOR
Joseph A. Groebli,
BY Briesen & Knauth
his ATTORNEYS (No Model.)  18 Sheets—Sheet 17.
J. A. GROEBLI.
CARD PUNCHING MACHINE.
No. 551,544.  Patented Dec. 17, 1895.
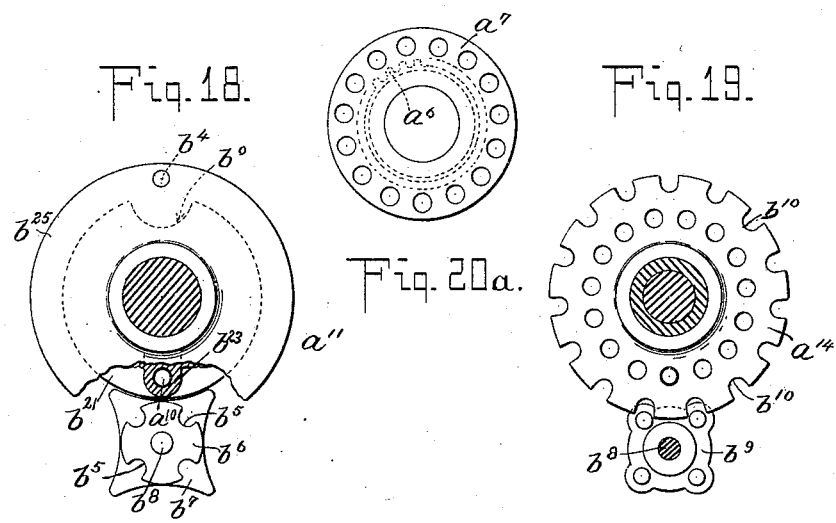
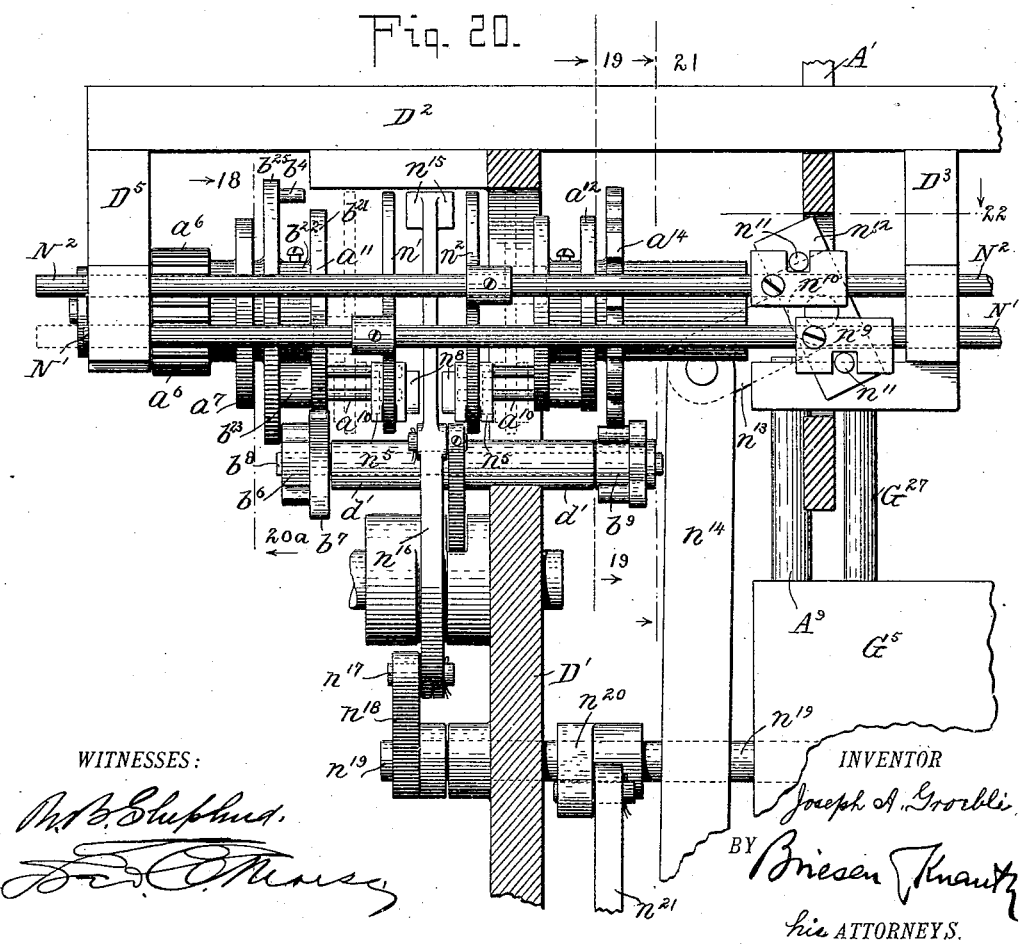
WITNESSES:
INVENTOR
Joseph A. Groebli
BY Briesen & Knauth
his ATTORNEYS.

(No Model.) 18 Sheets—Sheet 18.
J. A. GROEBLI.
CARD PUNCHING MACHINE.
No. 551,544. Patented Dec. 17, 1895.
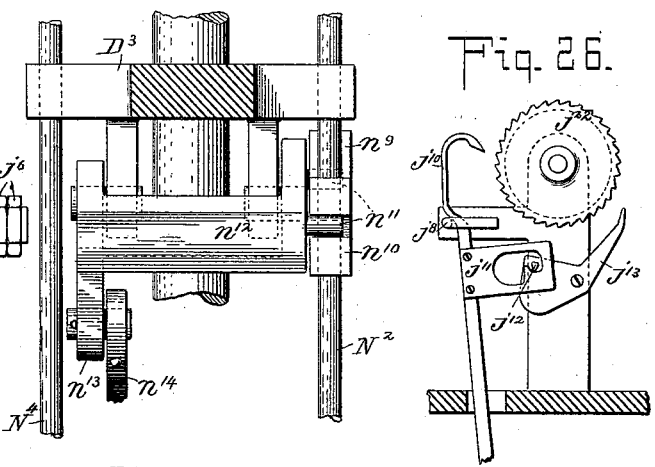
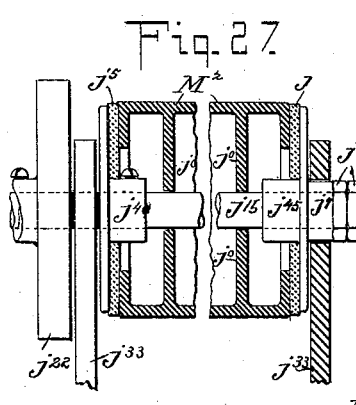
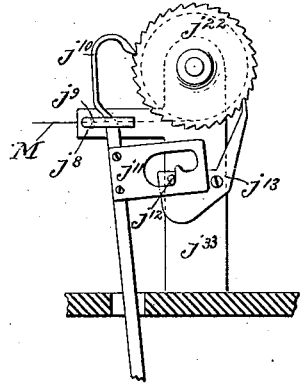
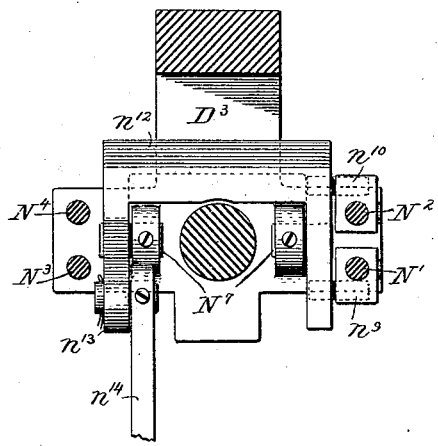
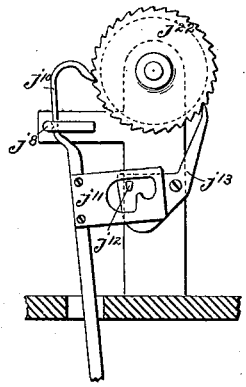
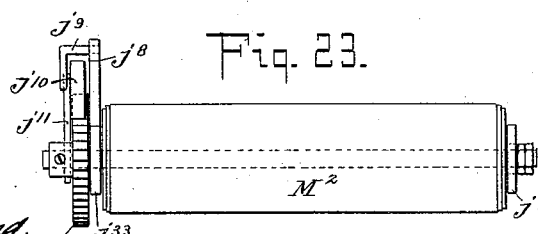
WITNESSES:
INVENTOR
Joseph A. Groebli,
BY Briesen & Knauth
his ATTORNEYS.

UNITED STATES PATENT OFFICE.

JOSEPH A. GROEBLI, OF NEW YORK, N. Y., ASSIGNOR TO THE KURSHEEDT MANUFACTURING COMPANY, OF SAME PLACE.

CARD-PUNCHING MACHINE.

SPECIFICATION forming part of Letters Patent No. 551,544, dated December 17, 1895.

Application filed November 22, 1894. Serial No. 529,549. (No model.)

*To all whom it may concern:*

Be it known that I, JOSEPH A. GROEBLI, a resident of the city, county, and State of New York, have invented certain new and useful Improvements in Card-Punching Machines, of which the following is a full, clear, and exact description.

My invention relates to card-punching machines, and has for its object to produce a machine that will punch Jacquard cards, being more especially adapted to punch cards for use in a certain fabric-moving mechanism for embroidering-machines, set forth and illustrated in Letters Patent No. 528,632, dated November 6, 1894.

To this end my invention consists of suitable mechanisms for measuring distances in two specific directions from stitch to stitch on the pattern and means for communicating the motions of these mechanisms to suitable mechanisms for selecting a plurality of punches for each measuring mechanism, the punches representing jointly the extent of motion of the measuring mechanism.

My invention further consists in certain details of construction of the machine herein described, illustrated in the accompanying drawings and more particularly pointed out in the claims, together with all structures which may justly be regarded as equivalent structures.

I attain the object of my invention by means of the mechanism illustrated in the accompanying drawings, showing one form of my machine, in which—

Figure 14:
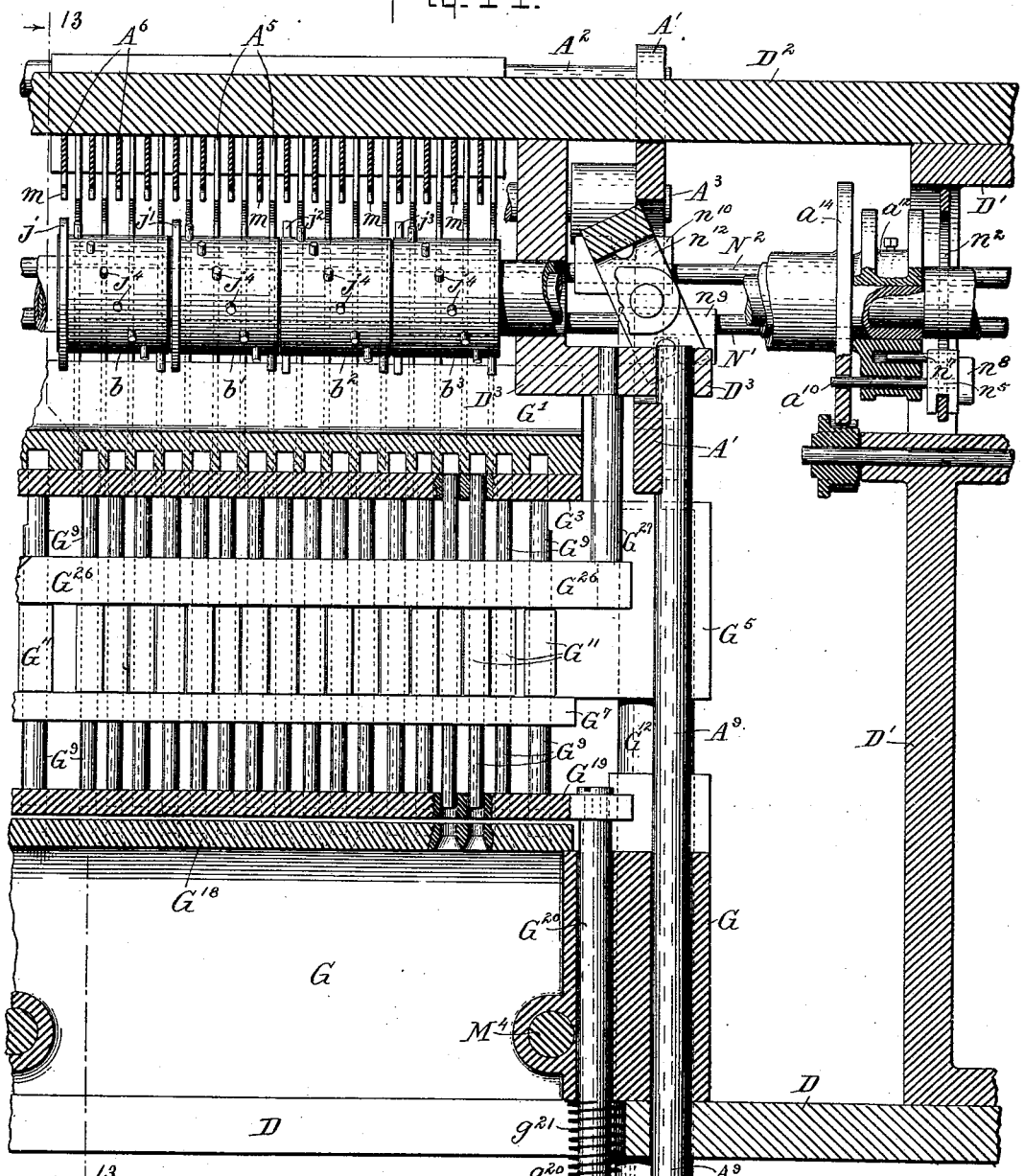
Figure 15:
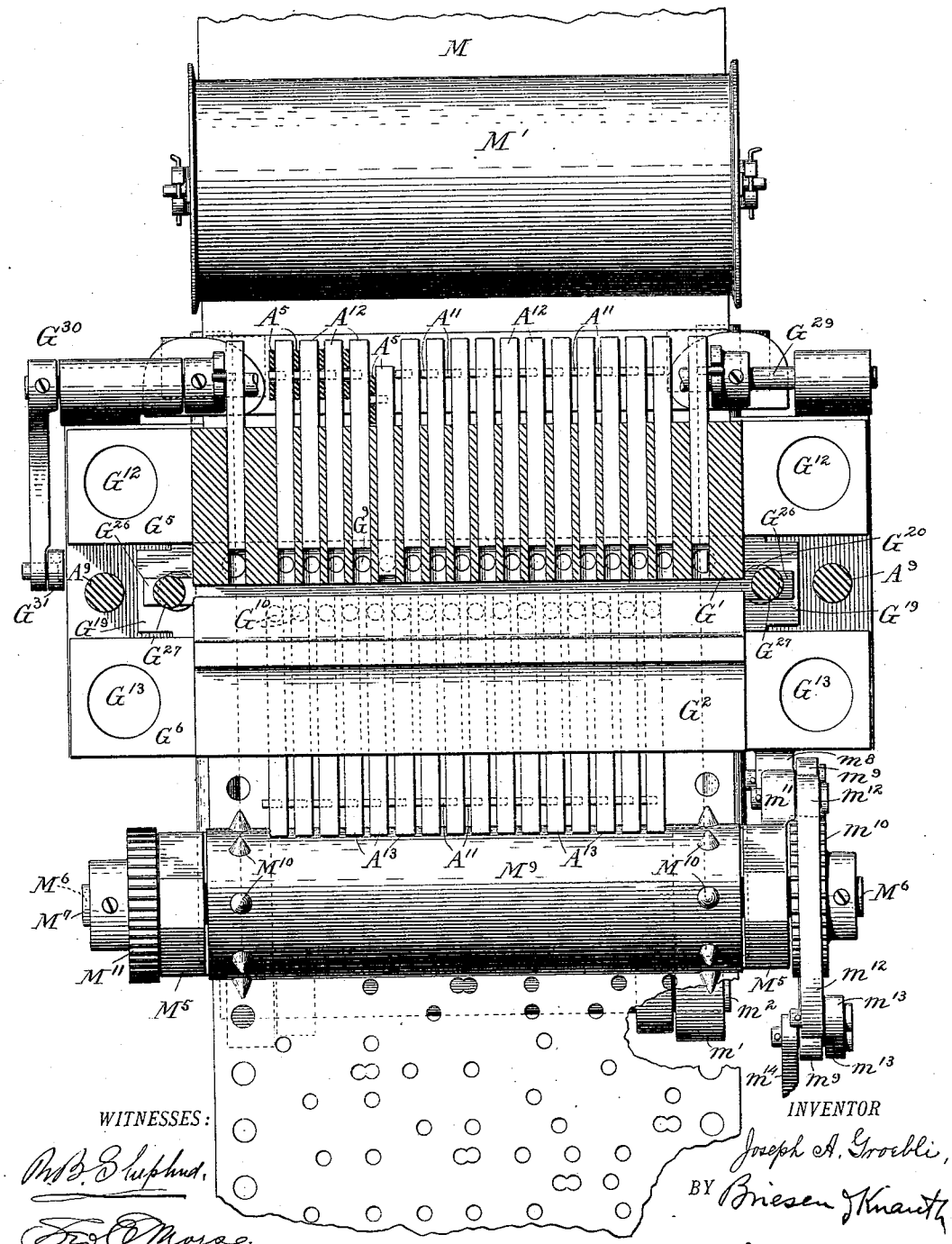

Figure 1, Sheet 1, shows a front elevation of the lower part of my card-punching machine. Fig. 2, Sheet 2, is a front elevation of the upper part of the same. Fig. 3, Sheet 3, is a side elevation of the lower part. Fig. 4, Sheet 4, is a side elevation of the upper part. Fig. 5, Sheet 4, is a vertical section on the line 5 5 of Fig. 2. Fig. 6, Sheet 5, is a fragmental plan view on line 6 6 of Fig. 1, looking from the rear, drawn to a larger scale than the preceding, illustrating the driving, starting, and stopping mechanisms, together with the hand-operated setting mechanism for the devices for selecting the punches, more clearly shown in Fig. 7, Sheet 6, which is a vertical section on the line 7 7 of the preceding figure, drawn to the same scale. Fig. 8, Sheet 7, is a front view, partly in section, on a still larger scale, of that part of my machine immediately above the bed-plate. Fig. $8^a$ is a detail side view of the mechanism for locking the gear-wheels $a^5$, hereinafter referred to. Fig. $8^b$ is a detail view of the mechanism for actuating the end punches, hereinafter referred to. Fig. 9 is a rear view of the same drawn to the same scale. Fig. 10 is a vertical section through the center of the driving-shaft, showing details of the friction-clutch. Fig. 11 is a horizontal section on the line 11 11 of Fig. 10. Fig. 12 is a fragmental vertical section on the lines 12 12 of Figs. 10 and 11, the latter three being drawn to the same scale as Fig. 9. Fig. 13 is a full-size vertical section on lines 13 13 of Figs. 8 and 14, showing the machine from the bed-plate up. Fig. $13^a$ is a view similar to Fig. 13, showing the parts below the bed-plate which operate the parts shown in Fig. 13. Fig. 14 is a vertical section at right angles to that of Fig. 13, taken on the line 14 14 of that figure. Fig. 15 is a sectional plan on the line 15 15 of Fig. 13. Fig. 16 is a detail section on the line 16 16 of Fig. 8. Fig. 17 shows the same mechanism as Fig. 16, but in a different position. Figs. 18, 19, and $20^a$ are details on the lines 18 18, 19 19, and $20^a$ $20^a$ of Fig. 20 that will be fully explained hereinafter. Fig. 20 is a rear view of that portion of my machine which is represented, on a smaller scale, in the left-hand upper corner of Fig. 8. Fig. 21 is a detail in vertical section on line 21 21 of Fig. 20. Fig. 22 is a plan of the same device on the line 22 22 of Fig. 20. Figs. 23, 24, 25, 26, and 27 are detail views of receiving-roller and its feed and release. Fig. 28, Sheet 5, is a horizontal section on the line 28 28 of Fig. 1. Fig. 29, Sheet 5, is a fragmental section on line 29 29 of Fig. 1, showing details of the pointer.

By referring to Letters Patent for the fabric-moving mechanism before mentioned, No. 528,632, dated November 6, 1894, it will be noticed that the Jacquard card passing around a perforated drum selects certain pins which, by their combined action, serve to move the fabric-frame in a predetermined direction and to a predetermined extent. This predetermined motion is the resultant of the motions of two slides. The motions of these two slides are the reproduction, on a smaller scale, of that given by the operator to two measuring mechanisms forming part of the herein-described machine. These measuring mechanisms move in front of and in a plane parallel to the face of a board on which is secured an enlarged duplicate of the pattern which is to be produced on the fabric of the embroidering-machine to which my fabric-moving mechanism is attached.

The mechanism illustrated in the accompanying drawings and described in the following specification selects automatically the proper punches to perforate the card, which, by means of the fabric-moving mechanism, reproduces the motions of the before-mentioned measuring mechanisms.

Before proceeding to the detailed description of the machine, I will state that I provide a device for measuring distances in a specific direction, and another device for measuring distances in another specific direction at an angle to the first direction, distances at angles to these two lines being measured by actuating both measuring mechanisms to a greater or less degree corresponding to the length and direction of the desired line. These measuring mechanisms are each preferably connected to a plurality of selecting devices for selecting the punches to be operated, so that a plurality of pins may be selected by the movement of a measuring mechanism. The reason for this will be apparent from an inspection of my patented machine before referred to, wherein the movements of the fabric-frame are effected by perforations in a pattern. These movements are primarily brought about by two movements of the fabric-frame on lines at an angle to each other, these angular movements being made simultaneously and thereby compounded to produce the resultant movement. Each of these angular movements will hereinafter be referred to as a movement on one line. The movements on one line greater than a specified extent are produced with the aid of a pattern by the joint action of a plurality of Jacquard pins, each of which imparts to the fabric-frame a predetermined extent of motion on the one line, these movements to predetermined extents being compounded in each case to give the resultant movement on one line—that is to say, if one pin gives a movement in a certain direction of a certain extent and another pin a movement of another certain extent on the same line the two movements are added or subtracted to produce the resultant movement on one line. Now in the present invention there is provided a series of punches for punching a pattern for giving these various movements, the extent of these movements depending upon the location of the perforations in the pattern which location will depend upon the position of the punch in the series of punches. This is what is meant by the expression "extent" as applied to the punches. For producing any movement on one line which is less than a certain specified extent but a single punch will be actuated. For movements on one line of greater extent than this fixed extent two punches will be actuated and their extents of movement compounded so that the extent of movement on one line will be equal to the sum or difference (as the case may be) of the various extents of the actuated punches, the punches thus representing jointly the extent of movement on the one line. Thus it will be seen that two punches are selected each representing an extent of motion the complement of portions of one measurement on one line. In this respect the invention differs from systems heretofore devised for that in existing systems but a single extent-punch is actuated to give a movement on one line, whereas by my invention I actuate a plurality of punches and add or subtract their extents by means of a reversing-punch in order to give the desired extent of movement on one line. These punches will in many cases be non-adjacent punches.

It may be proper to here explain that the reversing-punch is not solely for effecting a subtraction of a lesser movement from a greater, but is primarily for the purpose of punching the pattern to produce a reverse motion of the fabric-frame, for it will be obvious that the reversed motion must of necessity be subtracted from the direct motion when both are made simultaneously.

In the drawings, the main frame A or housings of the machine are securely held together by cross-ties B B, Figs. 1 to 5. Upon brackets C C, Fig. 1, made integrally with or otherwise secured to the frame, rests and is secured to them the bed-plate D. To the cross-ties B B of the upper part of the frame, on either side, brackets E E, secured to said cross-ties, support and are bolted to flat upright bars of steel F F. To the lower (Fig. 1) and upper ends (Fig. 2) of these bars F F are fastened U-shaped bearings $f$. In the two lower bearings $f$ rest and are free to rotate therein short shafts $f'$, which carry, secured to them between the parallel sides of the U-shaped bearings, flat-faced pulleys $f^2$. In the two upper bearings $f$ rest and are free to rotate therein two independent axles.

In a hub $f^3$ of the bearings $ff$ rests an idle shaft $f^6$ extending across the machine from one bearing to the other. The office of this idle shaft is to support two grooved pulleys $f^7$ which are mounted loosely on the shaft and held from lateral movement by two collars $f^5$. Thus the pulleys $f^4$ and grooved pulleys $f^7$ on either side rotate independently. Around the grooved pulleys $f^7$, extending downward and passing around two exactly-similar grooved pulleys $f^8$ of the same size as $f^7$, are two endless cords $f^9$ $f^{10}$ stretched sufficiently tight around their respective sheaves to transmit a rotary movement to these sheaves when an up or down movement is given to either or both cords by the operator, who sits or stands before the machine so that the cords $f^9$ $f^{10}$ are in convenient position to be grasped respectively by the left and right hands. In some convenient position are placed grooved pulleys arranged to take up the slack in the cords so as to keep them constantly taut. These are shown in Figs. 2, 4, and 5. Brackets $c$, extending upward from the tie-bars B, support a rod $c'$, which is held firmly in its bearings by set-screws $c^2$. On the ends of this rod $c'$, which extends beyond the brackets $c$, are rotatively mounted and held from slipping off by cotters two grooved pulleys $c^3$. Between the brackets $c$ and these pulleys are mounted on the stationary rod $c'$ hubs $c^5$ on the ends of lever-arms $c^4$, on the other ends of which are rotatively mounted and held from slipping off by cotters similar grooved pulleys $c^6$. In Fig. 2 will be seen one pair of these pulleys, which are placed so as to rotate in the same plane, which is coincident with that of the two larger grooved pulleys $f^7$ above and $f^8$ below. (See Fig. 1.) The axis of $c^3$ is fixed, while that of $c^6$ revolves around the rod $c'$ always in the path of and is limited in motion by the cord which it is to tighten. By a set-screw in the hub $c^5$ this pulley may be fixed in any desired position, thus forming a very simple and effective device for keeping the hand-cords always taut.

The sheaves $f^8$ are mounted loosely on the two independent shafts $f'$. Secured to the sheaves $f^8$ are the gears $a$, which mesh with gears $a'$, secured to shaft $a^{50}$. At the other end this latter shaft carries a small gear $a^2$, which latter meshes with gear $a^3$, which is firmly secured to shaft $f'$, which also, as before stated, carries the flat-faced pulley $f^2$ at its other end. The combination of pulleys $f^2 f^8$, gears $a$ $a'$ $a^2$ $a^3$ and shafts $f'$ and $a^{50}$ rotate independently of each other. Thus when the sheave $f^8$ is revolved by the pulling of the cord $f^9$ the flat-faced pulley $f^2$ will be revolved but to a lesser extent. In like manner will the cord $f^{10}$ revolve the flat-faced pulley $f^2$ on the other side.

Around the upper and lower pulleys $f^4$ $f^2$ respectively pass flat flexible steel bands $f^{11}$ $f^{12}$ on the left and right respectively. The band $f^{11}$ is divided into two sections, the lower engaging with the pulley $f^2$, Figs. 1 and 3, and the upper with the pulley $f^4$, Figs. 2 and 4. The front end of the upper section is secured to a slide $f^{13}$, and the front end of the lower section is secured to a similar slide $f^{14}$, but inverted in position. These slides are rigidly connected by being secured respectively to the upper and lower ends of one side of a rectangle $G^0$ made preferably of one piece of sheet-steel and cut away as shown in Figs. 1 and 2, so that the diagonal $g$ forms a diagonal straight edge.

The rear ends of the upper and lower sections of the steel band $f^{11}$, as seen in Fig. 4, are secured to some form of tightening device, which, in this case, consists of two stout spiral springs $f^{15}$. Secured to this band, preferably near to the tightening device, which is placed diametrically opposite to the rectangle $G^0$, are weights $f^{16}$ to counterbalance the weight of the rectangle $G^0$. The other steel band $f^{12}$ is secured to slides $f^{17}$ and $f^{18}$, which in turn are secured to a rectangle H, similar in every respect to the rectangle $G^0$, with its diagonal $h$ forming a diagonal straight edge. This rectangle H, however, is reversed in position, having its diagonal $h$ at an angle with the diagonal $g$. In the present case this angle is ninety degrees. There are also provided a tightening device and counterbalancing-weights, such as are provided for band $f^{11}$.

Fig. 28, Sheet 5, is a plan section on line 28 28 of Fig. 1, showing the construction of the slides $f^{14}$ $f^{17}$. The slides $f^{13}$ $f^{18}$ are similar.

By an inspection of Fig. 28 it will be seen that the upright steel bars F serve as vertical guides, and at the same time prevent horizontal movement in every direction.

The rectangle H, Fig. 1, which is made of thin metal, has its right-hand limb strengthened by a steel batten $h'$, which is seen to be riveted along its full length to this right-hand limb. This limb is secured to the two slides $f^{17}$ $f^{18}$ at top and bottom respectively, which, being attached to the steel band $f^{12}$, are free to move vertically with this band along ways cut in the upright bar F. On the other side of the machine the left-hand limb of the rectangle $G^0$ is strengthened by having riveted to it battens $g'$ $g^2$. Between these two battens, Fig. 28, on the inner side, is cut a groove $g^3$ in which slides the left-hand limb of the rectangle H. The rectangle $G^0$ is attached top and bottom on the left limb to the slides $f^{13}$ $f^{14}$, which, being attached as before explained to the steel band $f^{11}$, are free to move vertically with this band, being guided by the upright steel bar F. This rectangle $G^0$ overlaps the rectangle H and its right-hand limb slides in a groove $h^2$ cut in a steel guide-bar $h^3$, secured to the right-hand limb of the rectangle H.

Secured in any convenient manner to the frame of the machine is a board I, which is located near to and parallel with the rectangles $G^0$ H. To this board is tacked or otherwise secured an enlargement of the pattern which the card to be punched is to reproduce through the agency of another machine. Thus it will be readily understood how the measuring mechanisms operate to measure any stitch on the pattern, within the limits of the machine, in two specific directions by manipulating the cords $f^9$ $f^{10}$.

Referring to Fig. 6, Sheet 5, which is a plan view looking from the rear, it will be seen that the shaft $f'$, which is revolved by means of the cord $f^9$ and grooved pulley $f^8$ and train of gears $a$ $a'$ $a^2$ $a^3$, carries secured to it a spur-wheel $a^3$, which, through a train of gears $a^4$ $a^5$, transmits motion to a portion of the machine, which is shown more clearly in Fig. 8, Sheet 7, which is a front view, partly in section, showing the train of gears operated by the hand-cord $f^9$, which is exactly the same as that operated by the other hand-cord $f^{10}$ on the other side. This latter train operates to rotate the spur-wheel $a^6$, a detached view of which is shown in Fig. 20$^a$. A perforated flange $a^7$ containing fifteen holes (see Fig. 8) is formed on the same hub as the spur, or made separately and secured thereto. This spur is loose on a sleeve $a^8$ and held from lateral movement by a collar on the left and a clutch $a^{11}$ of peculiar construction on the right, which is also secured to the sleeve $a^8$. A sliding clutch-bolt $a^{10}$ locks the spur-wheel $a^6$ so that a rotation of this spur will rotate the sleeve $a^8$ and with it a drum or selector $b$ secured firmly at its inner end, as clearly shown. This sleeve as well as a similar one on the other side has its bearings in a hanger $D^3$ supported by a cross-bar $D^2$, which rests upon and is secured to two upright castings $D'$, which are firmly bolted or otherwise secured to the bed-plate $D$. Passing through and free to rotate therein is a shaft $a^{15}$, to whose inner end is firmly secured another drum or selector $b'$, which is similar to the drum $b$, except that the latter has a larger bore to accommodate the sleeve $a^8$. Abutting against the end of the sleeve $a^8$, which is flush with the outer face of the clutch $a^{11}$, is a shoulder formed by an enlargement $a^{13}$ of the shaft $a^{15}$. Secured to this enlarged shaft $a^{13}$ is a clutch $a^{12}$ corresponding in construction to the clutch $a^{11}$. The bearing of the enlarged shaft $a^{13}$ is in a hanger $D^4$ secured to the cross-bar $D^2$, while the other bearing for the smaller part $a^{15}$ is in the sleeve $a^8$. The enlarged shaft $a^{13}$ is kept from inward lateral movement by a disk $a^{16}$ fastened to its outer end, and from outward similar movement by carrying between the hanger $D^4$ and the clutch $a^{12}$ a stepping-wheel $a^{14}$ whose hub extends over the intervening space. This wheel is free to revolve on its shaft $a^{13}$, except when locked to the clutch $a^{12}$ by a clutch-bolt $a^{10}$, as shown in Fig. 8. The sleeve with its drum $b$ receives its motion from the spur $a^6$ when locked to the clutch $a^{11}$. The manner in which the shaft $a^{13}$ receives its movement will be more clearly understood by reference to Sheet 14, on which Fig. 20 is a full-sized view of the left-hand combination of clutches, &c., which is exactly like that on the right hand, the interior arrangement of sleeve $a^8$ and shafts $a^{13}$ $a^{15}$ being slightly different. The clutch $a^{11}$, of which a face view is seen in Fig. 18, is composed of two parallel disks $b^{21}$ $b^{25}$, of which $b^{25}$ is the larger, joined by a hub $b^{22}$ and lobe $b^{23}$, through which lobe slides in a suitable hole a locking-bolt $a^{10}$. (Shown clearly in Fig. 8.) Diametrically opposite to the lobe and locking-bolt is a pin $b^4$ extending from the disk $b^{25}$ over the hub $b^{22}$, which pin $b^4$ is arranged to engage one of the notches $b^5$ in a small wheel $b^6$ which is secured concentrically to or made a part of a wheel or flange $b^7$ provided with hollows cut in its circumference, which fit over the circumference of the disk $b^{21}$ of the clutch $a^{11}$, thus preventing a revolution of the wheel $b^6$, except at the times when the pin $b^4$ engages one of the notches $b^5$. Near this pin the circumference of the disk $b^{21}$ is cut away at $b^0$ to permit the wheel $b^6$ to revolve, (in the present case through one quadrant,) after which it is locked again. This wheel $b^6$ is secured to a small shaft $b^8$ which is rotatively mounted in an elongated bearing $d'$, forming part of or secured to the frame $D'$. Secured to the other or inner end of shaft $b^8$ is a pinion $b^9$ which engages with the stepping-wheel $a^{14}$ before mentioned. Fig. 19 shows a face view of this wheel which contains in its periphery fifteen notches $b^{10}$ which engage the teeth of the pinion $b^9$. This pinion is always in engagement, and therefore regulates the movements of $a^{14}$. Now, since every revolution of the clutch $a^{11}$ revolves the shaft $b^8$ with its pinion $b^9$ through one quadrant, the wheel $a^{14}$ will be revolved through one-fifteenth of one revolution. Hence it follows that for every fifteen complete revolutions of the clutch $a^{11}$ the stepping-wheel $a^{14}$ will make one complete turn. When, therefore, Fig. 8, the clutch $a^{11}$ is locked to the driving-spur $a^6$, and the clutch $a^{12}$ is locked to the stepping-wheel $a^{14}$, and spur $a^6$ be revolved, then will the drum $b'$ which revolves with the clutch $a^{12}$ be moved through one-fifteenth of one revolution for every complete revolution of the drum $b$ which revolves with clutch $a^{11}$.

The flange of the stepping-wheel $a^{14}$, in addition to the fifteen notches in its periphery, contains fifteen holes which may engage with the locking-bolt of the clutch $a^{12}$. This is clearly shown in Fig. 19.

I have described the hand-operated device on the right side which is controlled by the hand-cord $f^{10}$, Fig. 1. The device on the left, operated by the cord $f^9$, is similar, except that the shaft $a^{13}$ $a^{15}$ and sleeve $a^8$ are exactly reversed in position. Thus on the left-hand side the spur $a^6$ revolves loosely on shaft $a^{13}$ and the clutch $a^{11}$ is secured to this same shaft, which extends through the sleeve $a^8$ toward the middle of the machine, and has secured to its smaller end $a^{15}$ the drum $b^2$, while the stepping-wheel $a^{14}$ on that side revolves loosely on the sleeve $a^8$, which has secured to its left-hand end the clutch $a^{12}$, and to its right-hand end the drum $b^3$. The object of these two separate hand-operated mechanisms is to transmit to the two drums on each side the movements of their respective connected rectangles $G^0$ and $H$. These drums are best seen in the rear view, Fig. 14. There are two for each hand-cord and connected rectangle—$b$ and $b'$ for the right-hand cord $f^{10}$ and $b^2$ $b^3$ for the left-hand cord $f^9$. The construction of these drums will be best understood after the punching and feeding mechanisms (which are operated by other than hand-power) have been fully explained.

When it is desired to start the mechanism which is run by the belt J the operator pulls downward a cord $d^2$. (Seen on the left of Fig.

1.) This cord is secured below to a lever $d^3$ and above to a lever $d^4$. (Seen in Figs. 2, 4, and 5.) This lever $d^4$ is pivoted at $d^5$ to the upright bar F, and sustains at its rear end, secured to it by a swivel, a rod $d^6$, which extends downward, Fig. 7, Sheet 6, and is secured also by a swivel to the rear end of the starting-lever $d^3$. In Fig. 7 this lever $d^3$ is shown as cruciform, having the end of one of its shorter arms provided with a hub, which is secured to a rock-shaft $d^7$. Fastened to the same hub, or made with a separate hub and fastened to the same shaft $d^7$, is a lever-arm $d^8$, carrying at its end a pin $d^9$ which engages a slot in a curved lever $d^{10}$, which curved lever is pivoted at $d^{11}$ and has its rear end provided with a pin $d^{12}$, which serves as a detent for a clutch-actuating lever $d^{13}$. (Seen in plan in Fig. 6, Sheet 5, and on a larger scale in detail on Sheet 9.) Fig. 10 of Sheet 9 is a vertical section through the axis of the driving-pulley, looking from the rear. We here see the detent $d^{12}$ engaged with one end of the lever $d^{13}$ which is pivoted at $d^{14}$, the other end being actuated by a spring $d^{15}$, Fig. 11, which keeps the other end against the detent. Attached to this lever at or near its pivotal point is a short lever-arm $d^{16}$ carrying a friction-roller $d^{17}$ which plays between two collars $d^{18}$ secured to the driving-shaft E'. This shaft is rotatively mounted in bearings $e$ $e'$ cast as a part of a plate $E^2$ which is secured to the main frame A. These bearings might also be made a part of the main frame A.

Cast to the bearing $e'$ or otherwise permanently secured to it is a brake-wheel $e^2$ with a conical face extending into a clutch-wheel $e^3$, whose interior conical surface is similar to the exterior surface of the brake-wheel $e^2$. This clutch-wheel $e^3$ is secured to the driving-shaft E' near its outer end. This outer surface of the clutch-wheel is also conical and parallel to the interior surface of a driving-pulley $e^4$, whose exterior is that of an ordinary crowned pulley. This pulley is secured to the end of a short shaft $E^{30}$ which is rotatively mounted in a bearing $e^5$ which is a part of or made separately and secured to the plate $E^2$, which also supports the bearings $e$ $e'$ of the driving-shaft E'. This pulley-shaft is provided with a collar $e^6$ to prevent lateral movement. When the machine is at rest this clutch mechanism is in the position shown in Fig. 10, wherein the clutch-wheel $e^3$ is seen to be in contact with its brake-wheel $e^2$ and the driving-pulley $e^4$ free to rotate with its interior surface a short distance from the exterior surface of the clutch-wheel $e^3$, so that a slight throw of the driving-shaft E' toward the driving-pulley will cause the clutch-wheel $e^3$ to engage by friction with the driving-pulley, and thus to rotate with it. To the inner end of this driving-shaft E', Fig. 6, is secured a pinion $e^7$ which engages a toothed wheel $e^8$ which contains a cam-groove in each face, one of which is shown in Fig. 7. This groove $e^9$ engages a friction-roller $e^{10}$ in one end of a bell-crank $e^{11}$ which is pivoted at $e^{12}$. The other end of this bell-crank $e^{11}$ contains the pivot $d^{11}$ upon which hangs the curved detent-lever $d^{10}$ before mentioned.

Secured to the same rock-shaft $d^7$ to which the starting-lever $d^3$ is fastened is another lever $e^{13}$ whose lower end is provided with a friction-roller $e^{14}$ which plays in a cam-groove cut in the other face of the toothed wheel $e^8$. This cam-groove $g^{100}$ is shown in dotted lines in Fig. 7. When the machine is at rest the friction-roller $e^{13}$ is near a step in the cam-groove $g^{100}$, the motion of the wheel $e^8$ being arrested near that point by the brake-wheel $e^2$. The operation of this starting device is as follows: Referring to Fig. 7, the operator pulls down the cord $d^2$ which rocks the lever $d^4$ at top of machine and lifts the rod $d^6$, thus rocking the shaft $d^7$, lifting the end of lever $d^8$, whose pin $d^9$ tilts the curved lever $d^{10}$, thus withdrawing the detent $d^{12}$ and releasing the clutch-actuating lever $d^{13}$. Figs. 10, 11, and 12 illustrate more clearly what takes place. Lever $d^{13}$ is actuated by spring $d^{15}$, thus throwing the arm $d^{16}$ with its friction-roller $d^{17}$ against one of the collars $d^{18}$ which carries with it the shaft E' to which it is attached, thus engaging the clutch-wheel $e^3$ with the driving-pulley $e^4$, revolving the cam-wheel $e^8$ in direction of arrow seen in Fig. 7. The rocking of shaft $d^7$ also lifts the friction-roller $e^{14}$ on the end of lever $e^{13}$ beyond the step in the cam-groove $g^{100}$ where it rested in that part of the cam-groove farthest from its center. Upon the starting of the rotation this roller $e^{14}$ is immediately engaged in that part of the cam-groove which is nearest the center. The curved upright arm of the cruciform lever $d^3$ performs functions which will be explained at another part of this specification. At this stage of the movement the parts are as follows: The levers $d^3$, $d^8$ and $e^{13}$ are held in the positions in which they were brought by the rocking of the shaft $d^7$, the pin $d^9$ holding up the right-hand end of lever $d^{10}$, thus keeping the detent below the path of engagement with lever $d^{13}$, and that end of this lever which engaged the detent has been brought by action of spring $d^{15}$ to the position shown in dotted lines in Fig. 11. As the rotation continues, Fig. 7, the friction-roller $e^{14}$ at the end of lever $e^{13}$ is carried slowly away from the point of the cam-groove nearest the center, thus rocking shaft $d^7$ and the levers $d^3$ and $d^8$ secured thereto. At the same time the friction-roller $e^{10}$ of the bell-crank lever $e^{11}$ is moved toward the center of its cam, thereby moving toward the left in Fig. 7 the curved detent-lever $d^{10}$, bringing the end containing the detent $d^{12}$ below and in such a position as to engage, when raised, the clutch-actuating lever $d^{13}$. The pin $d^9$ descending permits the lever $d^{10}$ to return to its former inclination, thus bringing the detent $d^{12}$ into engagement with end of lever $d^{13}$, when, by action of bell-crank lever $e^{11}$, this detent pulls back the lever $d^{13}$ and brings the clutch-wheel $e^3$, Fig. 10, against its brake $e^2$, the friction-roller $e^{14}$ being near the step in its cam-groove when the machine is stopped, the parts being again in the position shown in Fig. 7.

It is found necessary to position the toothed wheels $a^5$ before the power-actuated devices are in motion. To this end are provided two pawls $i$ $i'$ which engage the toothed wheels $a^5$ on either side of the machine, as seen in the rear view shown in Fig. 9, Sheet 8. The pawl $i'$ is fastened in the end of a lever $i^2$ which is secured to a rock-shaft $i^3$ rotatively mounted in bearings in the housings D′ and kept from lateral movement by a collar $i^4$. On the right-hand end of this shaft, Fig. 9, is secured a short lever $i^5$ whose end rests upon a cam $i^6$ which is secured to the upright curved arm of the cruciform lever $d^3$. Resting on, and above the end of the lever $i^5$ is a stop $i^7$ fastened to the lower end of a bell-crank $i^8$ which is rotatively mounted on the rock-shaft $i^3$ and holds in its upper end the pawl $i$ which engages the wheel $a^5$. The lower end of this bell-crank rests upon a cam $i^9$ which is similar to cam $i^6$, and secured to it, or made of the same piece, but so arranged that cam $i^9$ will engage its lever $i^8$ before cam $i^6$ can engage its lever $i^5$. The cam $i^9$ operates to rock the bell-crank $i^8$ and force the pawl $i$ between two teeth. The cam $i^6$, acting a little afterward, rocks the shaft $i^3$, forcing the pawl $i'$ between two teeth, and thus both toothed wheels $a^5$ are positioned. When the operator has moved the hand-cords $f^9$ and $f^{10}$ as desired, it may happen that one of the toothed wheels $a^5$ will stop in such a position that the pawl $i$ or $i'$ cannot enter the space between two teeth, but will strike upon the top of one of them.

Suppose the pawl $i$ interferes with a tooth. The cam $i^9$ is so placed as to take effect at the first movement of the starting-lever $d^3$. If, therefore, the bell-crank $i^8$, by means of the interference of a tooth, cannot complete its movement, the starting-lever $d^3$ will be interrupted and become practically immovable until the wheel $a^5$ is turned slightly to enable the pawl to engage between the teeth. If, on the other hand, the pawl $i'$ interferes with a tooth on its wheel $a^5$, the cam $i^6$ will permit a slight movement of the starting-lever $d^3$, but not enough to withdraw the detent $d^{12}$. The operator is prevented, therefore, from starting the machine until the toothed wheels $a^5$ are properly positioned, and when interference occurs to prevent starting he has a positive indication on which side of the machine the interference lies. Thus, if he cannot pull down the starting-cord at all, (standing in front of the machine,) he knows that the interference lies on the left-hand side. If he can pull it down a short distance, but cannot start the machine, he knows that the interference lies on the right-hand side. The lever $d^3$ returns to its normal position at about one-half the revolution of its actuating cam-wheel. Just before it returns to this normal position (that shown in Fig. 7) an upwardly-projecting finger $i^{10}$ engages the upper arm of the bell-crank $i^8$, or a lug thereon, and pushes the pawl $i$ outside the path of engagement with the teeth of the wheel $a^5$. At the same time the stop $i^7$, Fig. 9, on the lower end of the bell-crank $i^8$ pushes down the lever $i^5$, rocking the shaft $i^3$ and carrying the pawl $i'$ outside the path of engagement with the teeth of the wheel $a^5$. The starting-rod $d^6$ on the rear end of the starting-lever $d^3$ is used in place of a cord in order to give weight on that end of the lever.

Having described the hand starting and automatic stopping of the machine, it remains to show what else takes place during one complete revolution of the shaft $E^3$, which I will call the "cam-shaft."

It is found necessary to lock the hand-operated selecting mechanism from possible movement while the power-actuated devices are in motion. As above stated, the pawls $i$ and $i'$ are provided to position the wheels $a^5$ before the power-actuated mechanism can be set in motion, so that the locking device which I will now describe can operate without interference. Referring to Fig. 8, Sheet 7, on either side we see a bell-crank $i^{11}$ rotatively mounted upon a pin $i^{14}$, whose forward arm carries a pawl $i^{12}$. (Seen just below the toothed wheel $a^5$.) The rear arm of this bell-crank (seen clearly in Figs. 8 and 8$^a$) is pivoted to a link $i^{13}$, which extends down through the bed-plate D and is connected to a pivoted bell-crank O, whose free end plays in a cam-groove $o$ in a cam O′ on the cam-shaft $E^3$. These parts constitute the actuating mechanism. The cam-groove $o$ is so made and proportioned as to press the pawls $i^{12}$ into engagement with the wheels $a^5$ immediately upon the starting of the machine, and to hold them in engagement until all the functions of the various parts of the power-driven mechanism have been performed, and then to withdraw them just as the machine is stopped.

Fig. 13 is a vertical section on line 13 13 of Fig. 8, Sheet 7, drawn full size. Near the top of this figure is seen one of a pair of symmetrically-shaped plates A′, both of which are seen in Fig. 8, which are joined together by six rods, three on each side, $A^2$ $A^3$ $A^4$, symmetrically placed, thus forming a frame for carrying two series of bell-cranks $A^5$ $A^6$, which are pivoted upon the rods $A^3$, sixteen on one side and sixteen on the other. The rods $A^3$ have a key $A^7$, each of which is cut at regular intervals to allow of a revolution of the bell-cranks around the rods at the cut-away points. Each bell-crank has a slot to admit the passage of this key $A^7$. This key then forms between the cuts therein regular spaces to keep the bell-cranks at regular distances apart; and when the rods $A^3$ are turned so that the keys $A^7$ will not register with their corresponding slots these bell-cranks cannot be removed from this frame. The upper arms of the cranks $A^5$ are guided in slots in a vertical plate $A^8$, which is secured to the rod A. These arms extend toward the center, and when the machine is at rest are pressed against the under side of the cross-bar $D^2$. They are provided with downwardly-projecting lugs $m$, which are aligned with a similar series of lugs $m$ on the ends of the horizontal arms of the bell-cranks $A^6$. The downwardly-projecting arms of these cranks $A^5 A^6$ are seen to be tangent to the rods $A^4$. Thus these rods, together with the cross-bar $D^2$, in the positions shown in Fig. 13, keep these cranks from moving.

Attached to each of the plates A' and extending downward through bearings in a die-block G secured to the bed-plate are two sliding rods $A^9$. (See Figs. 8, 9 and 14.) Both of these rods are actuated by one cam, (not shown,) which gives to the bell-crank frame a vertical movement equal to the distance (see Fig. 13) between the lugs $m$ on the bell-cranks $A^5 A^6$ and the upper surface of the drums $b\ b'\ b^2\ b^3$.

Referring to Figs. 13 and 14, on the left-hand end of drums or selectors $b\ b'$ are seen two sectors of annular rings $j\ j'$, which extend a little less than half-way around each drum in planes perpendicular to the axis. On the other two drums $b^2\ b^3$, secured to the opposite sides, are two similar sectors $j^2\ j^3$, respectively. Instead of the sectors described a series of pins on the line of the sector may be employed. Arranged around each drum in the form of a helix are pins $j^4$. Each of these drums intercepts the planes of eight of the bell-cranks $A^5 A^6$. They therefore divide these thirty-two cranks into four groups of eight each. In each group there are four cranks $A^5$ and four cranks $A^6$. The pins and the sectors on the drums all lie in the planes of these bell-cranks—the sectors in the plane of the first crank in each group, and two pins (one in each helix) in the plane of each of the other seven. These drums with their pins and sectors constitute the selectors for the punches, the actuation thereof being effected by means of the bell-cranks $A^5 A^6$, as will be hereinafter explained. It will be noted that the ends $m$ of these bell-cranks $A^5 A^6$ are all in substantially the same straight line, (see Fig. 13,) which line I designate as the "normal" line or plane, which is in a vertical plane at about right angles to the planes of the bell-cranks. It will likewise be noticed that the pins upon the selectors are placed radially at about equal angles and that the pin or pins which happen at the end of the movement of a measuring mechanism to be in the normal line will be the pin or pins which will actuate the punches. It will likewise be noticed that the sectors are placed upon but one side of the selectors, since these sectors serve to actuate a reversing-punch, the office of which will be explained.

We will now suppose that the selectors are in their initial positions and that a measuring device is about to be actuated. As the measuring device is actuated—say that which corresponds to the selectors $b^2\ b^3$—the fast drum or selector $b^3$ will rotate. As soon as this selector has made a half-revolution bringing its seventh pin, representing an extent of seven units of motion, into the plane of the normal, it will move the drum $b^2$ one tooth, so as to bring its first pin, representing an extent of fifteen units of motion, into the normal line or plane. If the measuring mechanism be stopped while the selectors are in this position, the punch which corresponds to fifteen units of extent of motion will be actuated by the selector $b^2$, but by having turned the selector $b^3$ one-half a revolution and brought its seventh pin under the normal, a punch corresponding to seven units of motion will be actuated by this selector. Under ordinary circumstances this would have the effect of producing in the pattern-card perforations which correspond to fifteen units of motion and seven units of motion, which would cause the Jacquard pins to add their motions, but having given the fast drum a semi-rotation, I have succeeded in bringing the sector thereon into such a position that a part of it lies in the normal plane. This sector, as I have before explained, actuates a reversing-punch, so that the extent of motion of the punch which was actuated by the seventh pin on the drum $b^3$ will, by reason of the fact that the reversing-punch is actuated and the pattern thereby punched, subtract its extent of motion from the fifteen units of extent given by the other punch, so that the actual extent of motion will be eight units of extent, which it will be seen corresponds to the proper extent to be given by the semi-revolution of the fast drum, and if the fast drum be further revolved up to any point less than another half-revolution, it will bring other pins into the normal, which pins will actuate punches of less extent, which, by virtue of the fact that the sector which actuates the reversing-punch extends half-way around the periphery of the drum, will cause punches representing less and less extents of motion to be actuated to subtract their motions from the extent of motion due to the punch actuated by the first pin upon the slow drum $b^2$. This arises from the fact that the pins upon the side of the drum opposite to that shown in Fig. 14 are placed in a reverse spiral direction. (See Fig. 8.)

It will of course be understood that the punches are by their location representatives of the extent of motion to be given on one line of the fabric-frame of the embroidering-machine, also that there is a sector on each of the slow drums—that is to say, the drums actuating the extent-punches which perforate the pattern to give a long motion. When this sector actuates its punch, the long motion will be reversed—that is to say, instead of being in the direction in which it was formerly, it is in an opposite direction, the true extent of motion on one line of the fabric-frame depending upon whether or not the motion represented by the punch actuated by the fast drum is in the same direction or in an opposite direction to the reverse motion given by the slow drum $b^2$, so that if both drums present their sectors to a reversing-punch, their motions will be added and will produce a motion on one line equal to the sum of the extents of motion of the two punches actuated, but in the direction known as the "reverse direction."

Referring again to Fig. 14 it will be noted that there are four drums and thirty-two punches, each drum actuating eight punches, the punches being thus divided into four groups of eight each. Of each group, the punches which are actuated by pins on the drums are known as "extent-punches," the punches which are actuated by the sectors being known as "reversing-punches." As an illustration of this, let us take drum $b^2$ and imagine it to be in rotation, and trace its effect. Beginning on the left, the first pin will, if brought into the normal plane, actuate a punch which will make a perforation so located as to impart fifteen units of motion to the fabric-frame. As the drum continues to revolve, the next pin to the left will presently come into the normal plane and will be in a position to actuate a punch which will impart thirty units of motion, the next pin forty-five, and so on, the common ratio being fifteen. These motions will be in a certain specified direction. If, however, the drum be rotated in an opposite direction, the pins are positioned to give the same extent of motion, but the direction of this motion will be opposite to formerly, for the reason that the sector will now begin to move in the normal plane, so as to actuate the reversing-punch. So throughout the series, regarding the normal plane as a line, it will be obvious that the perforations in the paper will correspond to the pins which are actuated, so that the portions of the selectors which at any time lie in the normal plane will present an exact counterpart of the appearance of the pattern, the pins corresponding to the perforations and the surfaces of the selectors to the imperforate portions of the pattern. In this respect the sectors may be regarded as the full equivalents of a series of pins in the same plane, as the portions of the sectors which lie between the transverse planes of the drums in which the extent-pins are located are not used to actuate the reversing-punches. Hence we may regard the sectors as presenting the appearance of a series of pins placed in the same plane as just described. It will further be apparent that this counterpart of the pattern consists of four sections, (selectors,) and is hence a composite selector, so that we have a composite selector, which, within the prescribed limits, may be shifted to represent the counterpart of any desired pattern. This composite selector is actuated from the two measuring mechanisms, a plurality from each mechanism—that is to say, $b$ and $b'$ from one measuring mechanism and $b^2 b^3$ from the other measuring mechanism—one of the selectors of each of the pairs $b\ b'$ and $b^2\ b^3$ being preferably actuated by the other selector. Hence if there be no reversing-punch actuated, or if both reversing-punches be actuated, the action of the extent-punches is cumulative, while if a single reversing-punch be actuated the action of the extent-punches will be differential. Thus if no reversing-punch be actuated the punches will perforate the card to effect an addition of their motions in a given direction, and if both be actuated the punches will still add their motions, but the direction will be the reverse of the former motion.

The ends of the lower arms of the bell-cranks have slots $A^{10}$, which engage pins $A^{11}$ in the sides of two series of horizontal sliding keys $A^{12} A^{13}$, which slide in smoothly-cut ways in guiding-combs $G' G^2$ respectively. These combs are firmly secured to two plates $G^3 G^4$ equal in area to that of the combs. These plates with their combs are firmly fastened to two stout blocks $G^5 G^6$ respectively, so that the inner edges of the plates overhang the inner faces of the blocks. To the lower ends of these blocks are secured suitable plates $G^7 G^8$, respectively, whose inner edges extend as far beyond the inner faces of the blocks as the plates $G^3 G^4$ overhang these same faces. These overreaching portions of the plates $G^3 G^4$ are provided each with a series of holes, corresponding to and registering with the spaces in the guiding-combs. These holes serve as guides for two sets of vertical punches $G^9 G^{10}$, all of which are provided with square collars $G^{11}$, which rest upon overreaching ledges of the plates $G^7 G^8$ when the machine is at rest, as shown in Figs. 13 and 14.

Referring to Fig. 15, Sheet 12, we see the blocks $G^5 G^6$ in plan, containing at each end, and secured in closely-fitting holes, stout rods $G^{12} G^{13}$ respectively. These rods (see Figs. 13, 13$^a$ and 14) slide through bearings in the before-mentioned die-block G, and extend downward through the bed-plate, and are fitted at their lower ends with collars $G^{14} G^{15}$. The two collars $G^{14}$ are connected by a rod $G^{16}$, to which are pivoted two links $G^{17}$ and $G^{100}$. To the link $G^{17}$ a bell-crank lever $G^{101}$ (see Figs. 7 and 13$^a$) is pivoted by one end, the free end $G^{102}$ of the bell-crank playing in the cam-groove $o'$ (seen in dotted lines in Fig. 13$^a$) in the face of the cam $O^2$ on the cam-shaft $E^3$. To the other link $G^{100}$ a bell-crank $G^{103}$ is connected by one end, which bell-crank is in turn connected to a lever $G^{104}$, which is connected to a swinging lever $G^{105}$, which is provided with a bowl $G^{106}$, which works in the cam-groove $o'$ in the cam $O^2$. The revolution of the shaft $E^3$ has the effect of pulling down the punches $G^9$ and $G^{10}$ a distance slightly greater than the vertical thickness of one of the sliding keys $A^{12}$ and $A^{13}$. The cam-groove $o'$ is so made, arranged and proportioned as to cause the punches $G^{10}$ to be actuated some time after the punches $G^9$. The reason for employing two sets or gangs of punches acting successively upon substantially the same line of the pattern is to enable me to overlap the perforations—that is to say, to get the centers of adjacent perforations nearer together than the diameter of the perforations.

Resting on the top of the die-block G and secured thereto is a die-plate $G^{18}$, having holes cut to exactly admit the punches $G^9$ $G^{10}$. The block G is open below the dies for the passage of the waste. A presser-plate $G^{19}$, having holes corresponding in number and position to the holes in the die-plate, rests upon the die-plate and is sufficiently thick to prevent the withdrawing of the cutting ends of the punches, thus forming a guide for these punches as well as a presser-plate for holding firmly the card or paper M while being punched. This plate, the ends of which are seen in plan in Fig. 15, is secured at right angles to a pair of rods $G^{20}$, one of which is shown very clearly in Fig. 14, Sheet 11. These rods slide in bearings in the block G, and are provided at their lower ends with washers $g^{20}$, prevented from falling off by cotters, between which washers $g^{20}$ and the bottom of the block G are placed contracted springs $g^{21}$, which operate to hold the presser-plate against the die-plate. Underneath each end of the rods $G^{20}$ is the free end of a lever $G^{21}$, one of which is clearly shown in Figs. $13^a$ and 14, which are secured to a rock-shaft $G^{22}$ rotatively mounted in bearings attached to the bed-plate. (Not shown.) Secured to the shaft is a crank $G^{23}$, which carries a friction-roller $g^{23}$ on its lower end which plays on the cam $O^2$ on the main cam-shaft $E^3$. This cam rocks the shaft $G^{22}$, causing the ends of the levers $G^{21}$ to lift the rods $G^{20}$ and the presser-plate $G^{19}$ at proper times.

Referring to Fig. 3, the card or paper pattern, rolled for convenience into a cylinder, is located at some convenient portion of the machine, as at $M^0$. From this roll, Fig. 7, Sheet 6, it passes around a cylinder $M'$, and thence through the feeding device to the receiving-cylinder $M^2$. Now referring to Figs. 13 and $13^a$ we see very clearly the pattern-feeding mechanism. The paper pattern passing around a portion of the cylinder $M'$ first passes under a light presser-plate $M^{22}$. This presser-plate or tension device is secured at right angles to two upright posts $M^3$, (see Figs. 8 and 13,) which are secured in a suitable manner at right angles to two horizontal sliding rods $M^4$, which pass through bearings in the block G, and at their rear ends are secured to two upright brackets $M^5$, (see Fig. 9,) which contain the bearings for two small shafts $M^6$ $M^7$, which carry between the uprights $M^5$, and secured to them, two rollers $M^8$ $M^9$, respectively, of equal diameter, the latter of which has spurs which mesh with a corresponding number of holes in the former. The shafts $M^6$ $M^7$, as seen in Fig. 9, project to the left beyond the bearings and are provided with two equal spur-wheels $M^{11}$ which compel synchronous revolutions of these two rollers, sufficient space being allowed between them to permit of the passage of the paper or card. The two upright bearings $M^5$, (see Fig. 13,) have lugs or bosses $m'$, in which is rotatively mounted a small shaft $m^2$, which carries secured to it two short crank-levers $m^3$, which carry in holes in their other ends a rod $m^4$ secured to the cranks in such a manner as to be parallel to shaft $m^2$. This rod $m^4$ rests in jaws, or may be secured therein, in the ends of two crank-levers $m^5$, Figs. 9 and 13, secured to a rock-shaft $m^6$ which is rotatively mounted in bearings in, or secured to, the bed-plate D. Fastened to this rock-shaft is another crank-lever $m^7$, whose lower end projects into the cam-groove $O^2$ in the cam $o^2$, so that the cam $O^2$ will give a slight rocking movement to the shaft $m^6$ which, through cranks $m^5$ and rod $m^4$, will impart a horizontal sliding movement to the feed-carriage. Attached to the block G, as seen in Figs. 13 and 15, is a lug $m^8$, to which is pivoted a downwardly-curved lever $m^9$, upon whose upper concave edge is a tooth $m^0$, (shown clearly in dotted lines in Fig. 13,) which may engage the lower teeth of a spur-wheel $m^{10}$, secured to the right-hand end, Fig. 9, of the shaft $M^6$ which projects beyond the bearings in $M^5$. Attached to the upright $M^5$, Fig. 13, is a lug $m^{11}$, to which is pivoted an upwardly-curved lever $m^{12}$, upon the lower concave edge of which is formed a tooth $m^{00}$, (seen clearly in dotted lines,) which may engage the upper teeth of the spur $m^{10}$. These two levers $m^9 m^{12}$ are pivotally connected by a link $m^{13}$ in such a manner that when the tooth $m^0$ on lever $m^9$ is engaged with wheel $m^{10}$ the tooth $m^{00}$ on lever $m^{12}$ will be free, and vice versa. To this link $m^{13}$ and also to the lever $m^9$ is pivoted another link $m^{14}$, which is pivoted at its lower end to a bell-crank $m^{15}$, which is actuated by the cam-groove $o^2$ in the cam $O^2$ to give to the link $m^{14}$ a reciprocating movement in the direction of its length. The object of this feeding mechanism is to move that portion of the paper which has been punched by the first set of punches $G^9$ so as to bring it directly beneath the other punches $G^{10}$, so that both sets of punches will cut upon the same transverse line of the card or paper. The feed then retracts the paper so that the punched line will in this case be exactly half-way between the two sets of punches. This movement is accomplished as follows: After the punches $G^9$ have done their work and are withdrawn from the paper the link $m^{14}$ is moved upward, thus engaging the curved lever $m^9$ with the spur-wheel $m^{10}$. The presser-plate $G^{19}$ is slightly raised, the crank $m^7$ rocks the shaft $m^6$ just enough to move the feed-carriage to the right one-half of the distance between the punches. The spur-wheel $m^{10}$, having its lower teeth held firmly by the tooth $m^0$ on the lever $m^9$, will roll, as it were, on this lever, moving the upper part of its pitch-circle just twice as far as its center. The diameter of this pitch-circle is made the same as that of the roller M⁸. Hence the upper surface of this roller, which carries the paper or card, moves the full distance between the punches G⁹ G¹⁰, bringing that portion of the paper under the punches G¹⁰ which was formerly under the punches G⁹. The paper is firmly held between the two rollers not only by friction, but by the meshing of the spurs M¹⁰ on the upper roller with suitable holes punched in the card or paper, as will hereinafter be more fully explained. Next the link m¹¹ is drawn downward, engaging the lever m¹² with, and releasing the lever m⁹ from, the spur-wheel m¹⁰, thus locking the rollers from further rotary movement, while the cranks m⁵ move the feed-carriage back to its original position, carrying the paper back one-half the distance between the punches. Thus the lines of holes in the card will be distant from each other just one-half the distance between the punches.

As the punched card is fed out at the rear it is taken up by a roller M², which is shown in detail in Figs. 23 to 27, inclusive. Fig. 23 is a plan view of this roller looking from the rear. Fig. 27 is a broken vertical section on a larger scale. The roller is cast or otherwise formed with two bearing-disks j⁰, through which passes freely a shaft j¹⁵. This shaft is provided with a ratchet-wheel j²², secured to the left-hand end thereof. It then passes through a bearing in j³³, and then carries secured thereto a wheel or disk j⁴⁴. Around the hub of this wheel and against its inner face is placed a felt or leather washer j⁵ against which abuts the flanged end of the roller M². This roller is centered on the shaft j¹⁵, and its other flanged end abuts against a similar washer which rests against the inner face of a wheel j⁴⁵ similar to j, but this one is loose on the shaft. Between this wheel and two nut-locks j⁶ is a washer j⁷ which rests in the other bearing j³³. By regulating the pressure upon the washers j⁵ by means of the nuts j⁶ the roller M² is made to revolve by friction with the ratchet-wheel j²² and yet may be turned independently about its shaft j¹⁵.

The action of the ratchet j²² is exhibited in Figs. 23 to 26 inclusive. When the machine is at rest the mechanism is in the position shown in Fig. 24. The upright j³³ on the ratchet side has a projection j⁸, in which is a hooked pin j⁹, which keeps from lateral movement a hook or pawl j¹⁰. Fastened to this hook in some convenient place is a small plate j¹¹, having an opening therein, as shown, which engages a pin j¹² on the lower weighted end of a pawl j¹³, which is pivoted to the upright bearing j³³. After the paper M has been punched and fed, the hook j¹⁰, which is held against the ratchet by gravity, is drawn downward by a cam (not shown) about the distance between two (more or less) teeth on the ratchet. Fig. 25 shows the lowest position of the hook j¹⁰. The part of a revolution thus imparted to the roller M² is a little more than sufficient to take up the slack in the paper at the start; and as the paper accumulates on the roller the slipping, before described, always keeps the paper taut. If the operator desires to turn back the roller for any purpose he pushes the pawl j¹⁰ away from the ratchet, thus lifting the weighted end of pawl j¹³, bringing them into the positions shown in Fig. 26.

If the operator forgets to replace the pawls, the machine will do so automatically; for it is evident from an inspection of Fig. 26 that when the hook j¹⁰ is pulled down by its cam the projection in the opening of j¹¹ will escape the pin j¹² and will allow the two pawls j¹⁰ and j¹³ to be thrown by gravity into engagement with the ratchet j²², as shown in Fig. 25.

When the blocks G⁵ G⁶, as seen in Fig. 13, (which with their guiding-plates below and above we may call the "gang-blocks,") are drawn downward, the punches following them by their own weight, first meet the surface of the paper. If the punches are in the positions here shown, as the gang-blocks continue to descend, the punches will be interrupted in their downward movement by the paper and their upper ends will enter the spaces in the comb G'. When the gang-blocks move upward to assume their normal position they will lift the punches by means of the washer-blocks G¹¹.

If for any reason the punches were held in their guides by friction and should be lifted thereby, their upper ends must be prevented from remaining in the spaces in the comb G'. This is accomplished by means of a stationary bar G²⁶, (seen in Fig. 14,) which is secured to the hanging brackets D³ by means of the vertical rods G²⁷. This bar passes between the two gangs of the punches G⁹ and G¹⁰, and is arranged so that it will engage the washer-blocks G¹¹ in their upward movement. The blocks G¹¹ are made just long enough to fill up the space between the plates G⁷ and G⁸ and the stationary bar G²⁶ in their normal positions. (See Fig. 13.)

Referring to Fig. 1, when the operator has moved the rectangles H and G⁰ by means of the hand-cords f⁹ f¹⁰, the drums b b' b² b³, Fig. 14, Sheet 14, have revolved, as before described, so as to bring certain of the pins j⁴ in the uppermost position, (see Fig. 13, Sheet 12,) the starting-cord is then pulled and the machine started. One of the first functions performed is the drawing downward of the bell-cranks A⁵ A⁶, as before described. Whenever one of the pins j⁴ or the flanges j' j² engages one of the lugs m on these cranks that particular one will be rocked and its lower arm pushed inward, carrying with it the particular horizontal sliding key A¹² or A¹³ with which it engages. The next operation is the pulling down of the gang-blocks G⁵. The sliding keys $A^{12}$ which have been moved inward will cause the punches which they engage to puncture the paper or card M, while those punches whose corresponding keys have not been moved will remain inoperative; and so with the other set of punches $G^{10}$. It will be observed that the selectors do not participate in this bodily movement of these parts, but remain stationary to effect the selection of the punches, so that while they may be rotated they are nevertheless stationary in the sense that they are never displaced.

By reference to Figs. 14 and 15, Sheets 11 and 12, respectively, it will be seen that there are two more punches in the set $G^9$ than in the set $G^{10}$; also that these two extreme punches are of larger caliber than the others. It will be also noticed that the sliding keys $A^{12}$, which make the punches operative, are not operated as are all the others by bell-cranks, but by slotted cranks $G^{28}$, (see Figs. 8, $8^b$, 13 and 15,) which are secured to a rock-shaft $G^{29}$, which is rotatively mounted in bearings attached to the die-block G. To one end of this rock-shaft is secured a crank $G^{30}$, (clearly shown in Figs. 8 and 15,) to which is pivoted a link $G^{31}$, which extends downward through the bed-plate D and is connected to a bell-crank $G^{300}$, whose free end plays in a cam-groove $o^3$ in a cam $O^3$ on a cam-shaft $E^{330}$. A gear 33 is also mounted on the shaft 330 and meshes with a gear 33 on the cam-shaft $E^3$. The gear 330 has twice as many teeth as the gear 33. Hence one revolution of the cam $O^3$ requires two revolutions of the main cam-shaft; but the card is punched with every complete revolution of the main cam-shaft. Hence these two extreme punches are only operated with every alternate revolution of the main cam-shaft. The punctures thus formed are intended for meshing with the spurs $M^{10}$ of the feed-roller $M^9$, Figs. 13 and 15.

In embroidering-machines in general each stitch corresponds to the movement of the fabric-frame, which comes to a stop before the needles enter the fabric, and remains stationary till they are withdrawn. Moreover, the position of the fabric-frame at the beginning of each movement thereof is that assumed at the completion of the preceding movement. Hence the fabric-moving mechanism is so constructed that it will return to a normal position after each movement of the fabric-frame. Since the card which is the product of my present invention is to regulate the movements of this fabric-moving mechanism, it follows that the punching mechanism must also return to a normal position after each operation of punching. To this end I have constructed certain devices which I will now proceed to describe.

It must be borne in mind that the movements of the fabric-frame in the embroidering-machine which are effected by the punctures in the card selecting the proper pins are the resultant of the motions of two slides, and the motions of these two slides are the exact counterpart on a smaller scale of those imparted by the operator of the punching-machine to the two rectangles on the face of the pattern before him. The train of gearing operated by the hand-cords, as previously mentioned, is therefore connected to the set of drums, which I will call the "selecting" mechanisms, by clutches which may be unlocked for the purpose of permitting the selecting mechanisms to be returned to their normal positions without in any way disturbing the hand-operated gearing for setting the same.

In Fig. 1, hanging from the cross-bar $D^2$ at each end thereof, are seen the hanging-bearings $D^5$. These support the slender rods N' $N^2$ which extend across the machine and have their extreme bearings in these brackets $D^5$. In Fig. 7, Sheet 6, we see an end view of one of these brackets $D^5$, showing four rods N' $N^2$ $N^3$ $N^4$, the last two exactly like the first two. These rods are, for greater rigidity, supported by two other intermediate bearings $D^3$ $D^3$. (Seen clearly in the rear view, Fig. 9.) Secured to these rods at right angles thereto are rings $n'$ $n^2$ $n^3$ $n^4$, whose form is more clearly seen in Sheet 13, Figs. 16 and 17, which show a face view of one of these rings $n^2$. The other three are exactly like this one, but differently placed. $n'$ and $n^3$ are similarly placed, Fig. 9, and are secured to the lower rods N' and $N^3$. To the two upper rods $N^2$ $N^4$ are secured the rings $n^2$ $n^4$, but in an inverted position. These rings serve as circular guides for small blocks $n^5$, one of which is clearly shown in Figs. 14 and 16, Sheets 11 and 13, respectively. This block has projecting from it two bolts $a^{10}$ $n^7$, the former of which is much longer than the latter. These bolts move snugly in holes cut in the clutch $a^{12}$, before described. This clutch is fastened to the same sleeve to which is secured the selecting-drum $b^3$. The longer bolt $a^{10}$, as shown in Fig. 14, extends through the clutch-block $a^{12}$ and into the stepping-wheel $a^{14}$. The shorter one $n^7$ acts merely as a guide to retain the block $n^5$ in a radial position with the axis of the clutch $a^{12}$. This block is also provided with a lobe $n^8$, whose office I will shortly explain. There is one of these blocks $n^5$ for each of the guide-rings $n'$ $n^2$ $n^3$ $n^4$, as seen in Fig. 8. The pair on each side extend in opposite directions, the lobes $n^8$ extending toward each other. Secured to the two rods N' $N^2$ are two slotted blocks $n^9$ $n^{10}$, (seen more clearly in Fig. 20,) which engage two pins $n^{11}$ $n^{11}$ secured to, and at equal distances from, the axis of a crank $n^{12}$, whose construction is clearly shown in Figs. 21 and 22, Sheet 15. To an arm $n^{13}$ of this crank is pivoted a link $n^{14}$, which is actuated by a cam from below (not shown) to give to it a reciprocating movement in the direction of its length. When the link $n^{14}$ and crank $n^{12}$ are in the positions shown in Fig. 8, the hand-operating device is connected with the selecting mechanism. When the link $n^{14}$ is drawn downward the crank $n^{12}$ will turn upon its bearings $N^7$, Fig. 21, and will assume the position shown in Fig. 20. This will move the rods $N'$ $N^2$ in opposite directions in their horizontal bearings, causing the pair of guiding-rings $n'$ $n^2$ and also the pair $n^3$ $n^4$ on the other side to approach each other, carrying with them the blocks $n^5$ and withdrawing the clutch-bolts $a^{10}$ from their respective perforated wheels, thus releasing the selecting mechanism from the hand-operated gearing. This drawing together of these rings brings the lobes $n^8$ within the path of the projecting lips $n^{15}$ on the ends of two pairs of curved levers $n^{16}$, Fig. 16, which are hinged at $n^{17}$ to cranks $n^{18}$, which are secured to a rock-shaft $n^{19}$, Fig. 8, which extends across the machine and has its bearings in the upright $D'$. This rock-shaft $n^{19}$, Fig. 20, has a crank $n^{20}$ secured to it at some convenient portion of its length, to which is pivoted a link $n^{21}$ which is actuated by a cam from below, (not shown,) which gives to it a reciprocating movement in the direction of its length, Fig. 9. The curved levers $n^{16}$, Sheet 13, are pivoted somewhere near their middle to two shorter levers $n^{22}$, which have their other ends pivoted to the housings. When the link $n^{21}$ is held in its upper position the upper ends of these levers $n^{16}$ will be held together, as indicated in full lines in Fig. 16. When the link $n^{21}$ is drawn down, the levers $n^{16}$ will assume various positions between that shown in full and dotted lines in Fig. 16. One of these positions is shown in Fig. 17. This combination of levers is so arranged that the lips $n^{15}$ will move in a path that will always engage the lobes $n^8$ on the blocks $n^5$, which may stop at any portion of the ring within which it revolves. The operation of this device is as follows: Near the end of the revolution of the main cam-shaft, after the punching has been accomplished, the link $n^{14}$ (see Fig. 20) is pulled down, rocking the crank $n^{12}$, and thus unlocking the selecting mechanism from the hand-gearing, and bringing the lobes $n^8$ in the path of the ends of levers $n^{16}$. Next the link $n^{21}$ is pulled down, rocking the shaft $n^{19}$ and causing the levers $n^{16}$ to assume their lowest positions. (Shown in dotted lines in Fig. 16.) Between the lips $n^{15}$ of these levers $n^{16}$ in their lowest positions, the lobes $n^8$ of the blocks $n^5$ are held in their normal positions while the guiding-rings restore the locking-pins, and the levers $n^{16}$ are returned to their upper positions, (shown in Figs. 16 and 20,) and the machine is stopped, being in readiness for the next selecting and punching operation.

Before specifying my claims of invention I desire to have it understood that the principles underlying the mechanism of my punching-machine can be employed with many modifications. I have been particular in describing the construction of the parts of my device in positive terms and in considerable detail, stating how certain parts are connected as well as the particular configuration of the parts. It is evident, however, that the form of the parts, their connection and arrangement may be greatly varied without departing from the spirit of my invention. Again, I have described a particular machine which is represented in the drawings as operating with the aid of certain drums; but I wish it distinctly understood that I do not in any manner limit myself to the use of drums, as any suitable selecting mechanism may be used. I would also have it understood that I do not limit myself to the particular measuring mechanisms, as they also may be greatly varied. For instance, to trace the pattern I may use in lieu of the rectangles $G^0$ H a pair of glass plates each having a diagonal line corresponding to the diagonals $g$ $h$ of the rectangles $G^0$ H, which lines are at an angle to one another; or to facilitate the resolving of the stitch on the pattern and to avoid any unevenness of the surface of the pattern I may employ a "sight" $g^7$, which rests on the two edges and may follow them by its gravity and projects toward the pattern, and the position of which in no wise affects the selecting mechanism. So, again, I have shown the selecting devices as geared to each other and one selecting device moving more rapidly than the other; but it is obvious that I may move the selecting devices at the same rate of speed by separate means or at different rates of speed by separate means, if desired. I have also represented the ratio of movement of the selecting devices as that of fifteen to one, but it is obvious that any other ratio of movement may be selected. I therefore desire it to be particularly understood that I do not limit myself to the precise details or numbers of parts and forms of construction shown in the drawings or described in the specification. I have simply endeavored to clearly state one form in which my invention may be clothed. Other forms will readily occur to those who may choose to enjoy the fruits of my invention.

Having described my invention, what I claim, and desire to secure by Letters Patent, is—

1. In a punching machine, in operative combination, the following instrumentalities, namely; a measuring device, a plurality of extent punches each representing an extent of motion of the measuring device equal to the complement of portions of one measurement on one line, selecting mechanism intervening between the measuring device and the punches, for selecting the punches, and means for causing the selecting mechanism to select a plurality of punches for operation, which jointly correspond to the extent and direction of the measurement of the measuring device on the one line.

2. In a punching machine, the combination with punches and a measuring mechanism, of composite selecting mechanism comprising a plurality of co-operating selectors, means for actuating one of the selectors and means for driving another selector from the first mentioned selector.

3. In a punching machine, the combination of punches, a measuring mechanism, one or more drums $b$ for selecting the punches, mechanism connecting the measuring mechanism with the drums for rotating the same, and one or more clutches for coupling the mechanism for rotating the drums with the drums, substantially as described.

4. In a punching machine, the combination of punches, a measuring mechanism, one or more drums $b$ for selecting the punches, mechanism for connecting the measuring mechanism with the drums for rotating the same, mechanism for coupling and uncoupling the drums with their rotating mechanism, and means for restoring the drums to their initial positions while disconnected from the measuring mechanism, substantially as described.

5. In a punching machine, the combination of punches, a rectangle H for measuring distances on the pattern, a composite selecting mechanism for selecting the punches comprising a plurality of co-operating selecting drums, a band $f^{12}$ connected to the rectangle and by intervening mechanism to the drums, so that the movement of the rectangle determines the rotation of the drums, substantially as described.

6. In a punching machine, the combination of punches, a rectangle H, one or more drums $b$ for selecting the punches, a band $f^{12}$ connected to the rectangle, and by intervening mechanism to the drums, together with a pawl $i^{12}$ for locking the drums, and means for operating the pawl, substantially as described.

7. In a punching machine, the combination of punches, a rectangle H, one or more drums $b$ for selecting the punches, a band $f^{12}$ connected to the rectangle and serving through intervening mechanism to rotate the drums, together with clutches $a^{11}$ $a^{12}$, and bolts $a^{10}$ $a^{10}$, whereby the drums may be coupled with or uncoupled from their operating mechanism, substantially as described.

8. In a punching machine, the combination of punches, a rectangle H, one or more drums $b$ for selecting the punches, a band $f^{12}$ connected to the rectangle and serving through intervening mechanism to rotate the drums, clutch $a^{11}$ with bolt $a^{10}$ serving to couple or uncouple the drum from its operating mechanism, blocks $n^5$ connected to the bolt $a^{10}$, and levers $n^{16}$ engaging with the blocks, whereby the drums may be restored to their initial positions, substantially as described.

9. In a punching machine, the combination of a series of punches, mechanism for actuating the punches, a plurality of co-operating selectors for selecting the punches to be actuated, a device for measuring distances on one line on the pattern, mechanism intervening between said measuring device and the selectors for moving the selectors and a connection between the selectors operating to cause the selectors to jointly select a plurality of punches representing portions of the extent of movement of said measuring mechanism, substantially as described.

10. In a punching machine, the combination of a series of punches, mechanism for actuating the same, a plurality of co-operating selectors for selecting the punches to be actuated, a measuring device for measuring distances on the pattern on one line, mechanism intervening between the measuring device and the selectors for actuating the same from the measuring device and a connection between the selectors capable of selecting a plurality of punches each representing an extent of motion equal to the complement of portions of one measurement on one line, and means for connecting and disconnecting the measuring mechanism from the selecting mechanisms, substantially as described.

11. In a punching machine, the combination of a series of punches, mechanism for actuating the same, a plurality of co-operating selectors for selecting punches to be actuated, a measuring device for measuring distances on the pattern on one line, mechanism intervening between the measuring device and the selectors positioning the selectors for selecting a plurality of the punches representing portions of the extent of movement of said measuring device on one line, mechanism for connecting and disconnecting the measuring device from the selectors, and mechanism for restoring the selectors to their initial positions, substantially as described.

12. The combination of a measuring mechanism, punches, a drum $b'$ for selecting the punches, a shaft carrying the same, a clutch $a^{12}$ connected thereto, a stepping wheel $a^{14}$ loose on the said shaft, a wheel $b^9$ in gear with the stepping wheel, mechanism for rotating the same actuated from the measuring mechanism, and a bolt $a^{10}$ for coupling the clutch $a^{12}$ and the stepping wheel $a^{14}$, substantially as described.

13. In a punching machine, the combination of a measuring mechanism, punches, a drum $b'$ for selecting the punches, a shaft carrying the same, a clutch $a^{12}$ connected to the said shaft, a stepping wheel $a^{14}$ loose on the same shaft, a wheel $b^9$ gearing with the wheel $a^{14}$, a shaft $b^8$, a wheel $b^6$, a clutch $a^{11}$ mounted upon a sleeve $a^8$, a drum $b$ for selecting the punches, also mounted upon the sleeve, a wheel $a^6$, a driving wheel $a^5$ for the same actuated from the measuring mechanism and coupling pins $a^{10}$ $a^{10}$ for coupling the mechanism for rotation, whereby the movements of the driving wheel $a^5$ will be communicated to the drums $b$ $b'$, substantially as described.

14. In a punching machine, the combination of punches, a shaft or sleeve, a selecting drum carried thereby, having pins arranged around its periphery in a helical line, and a sector also upon its periphery in a plane at an angle to the axis of the drum, and a measuring device connected to the drum, substantially as described.

15. In a punching machine, the combination of punches, a measuring mechanism, a selecting drum $b$, and a selecting drum $b'$ for selecting the punches, mechanism for communicating motion from the drum $b$ to the drum $b'$, and a connection between the measuring mechanism and the drum $b$, substantially as described.

16. In a punching machine, the combination of a ring $n'$, block $n^5$ sliding upon the ring $n'$ and carrying a bolt $a^{10}$, disk $b^{21}$, hub $b^{22}$, disk $b^{25}$, carrying pin $b^4$, together with a wheel $b^6$ for co-operating with the pin $b^4$, and means for moving the ring $n^2$ laterally, substantially as described.

17. The combination of a ring $n^2$, block $n^5$ sliding freely upon the ring, bolt $a^{10}$, disk $a^{12}$, clutch $a^{14}$ for co-operation with the bolt, a lobe $n^8$ on the block, and levers $n^{16} n^{16}$ for engaging the lobe to restore it to its initial position on the ring, substantially as described.

18. The combination of a ring $n^2$ with levers $n^{16}$, a block $n^5$ on a bolt $a^{10}$ sliding upon the ring and having a lobe $n^8$, said lobe projecting into the path of the levers $n^{16}$, and a lever $n^{18}$ for operating the levers, substantially as described.

19. The combination of a ring $n^2$ with levers $n^{16}$, a block $n^5$ on a bolt $a^{10}$ and rotating freely on the ring, a lobe $n^8$ on the block projecting into the path of the levers $n^{16}$, a lever $n^{18}$ connected to the levers $n^{16}$ for moving the same, and pivoted links $n^{22}$, each connected to a lever $n^{16}$ for guiding the same in its movement, substantially as described.

20. The combination of a conical faced brake-wheel $e^2$ rigidly attached to the framing of the machine, of a driving pulley $e^4$ secured to a shaft $E'$ having a conical interior surface and surrounding the brake wheel, with a conical clutch pulley entered into the driving-wheel and embracing the brake-wheel, and means for throwing the clutch-wheel into and out of engagement with the driving pulley, substantially as described.

21. In a punching machine, the combination of punches and selecting mechanism therefor, a shaft $f'$ carrying pulley $f^2$, pulley $f^4$, rectangle H, band $f^{12}$ connected to rectangle H and passing around pulleys $f^2 f^4$ and a connection between the rectangle and the selecting mechanism for the punches, substantially as described.

22. The combination in a punching machine, of punches and selecting mechanism therefor, a pulley $f^2$ on the frame of the machine, a pulley $f^4$ likewise on the frame of the machine, a rectangle $G^0$, a band $f^{11}$ connected to the rectangle $G^0$ and a connection between the rectangle and the selecting mechanism for the punches, and a tension device interposed in the band $f^{11}$, substantially as described.

23. The combination of a rectangle $G^0$, a shaft $f'$ carrying a pulley $f^2$, a band $f^{11}$ connected to rectangle $G^0$ and passing around the pulley $f^2$, a wheel $f^8$ on the shaft $f'$, and a cord $f^9$ passing around the pulley $f^8$ and serving to rotate the same, substantially as described.

24. In a punching machine, the combination of a measuring mechanism, a cord $f^9$ for moving the measuring mechanism, a tension device therefor, the same consisting of a pulley $c^3$ mounted upon the framework of the machine, and a pulley $c^6$ carried on an arm $c^4$, a selecting mechanism, and means for actuating the selecting mechanism from the cord $f^9$, substantially as described.

25. In a punching machine, the combination of power actuated punches and selecting mechanism therefor, hand operated measuring mechanism and starting mechanism for the power mechanism for the punches, and positioning mechanism for the hand-operated mechanism for the measuring mechanism co-operating with the starting mechanism, whereby the starting mechanism is held from operation until the positioning mechanism has been operated, substantially as described.

26. The combination of a shaft $j^{15}$ having a ratchet $j^{22}$ connected thereto for rotating the same, a wheel $j^{44}$ rigidly mounted on the shaft $j^{15}$, a wheel $j^{45}$ loosely mounted on the same shaft $j^{15}$, a drum $m^2$ upon the shaft between the wheels, friction material interposed between the ends of the drum and the wheels, whereby the drum may be frictionally held by the wheels and at the same time be free to be rotated on the shaft, substantially as described.

27. The combination of a shaft $j^{15}$, a drum $m^2$ mounted thereon, a ratchet $j^{22}$ also mounted on the shaft, a pawl $j^{10}$, a plate $j^{11}$ having an opening therein provided with a locking projection, a pawl $j^{13}$ engaging the ratchet $j^{22}$ and having a pin $j^{12}$ working in the opening in the plate $j^{11}$, substantially as described.

28. The combination with a stationary selecting mechanism of a series of punches, a series of sliding keys, a series of bell crank levers pivoted in and carried by a suitable carrying frame, each of said bell crank levers being connected by one end to a sliding key, and having its free end projecting over the selecting devices, with mechanism for moving the frame to cause the ends of the bell crank levers to contact with the selecting devices, whereby the selecting devices will act to select the proper keys for engagement with the punches, substantially as described.

29. In a punching machine, the combination with a series of sliding keys, each of which is adapted for engagement with a punch of a series of pivoted bell crank levers carried in a movable frame each having one end connected with a key, and having its free end in proximity to the selecting devices, and mechanism for moving the frame to cause the bell crank levers to be moved by the selecting devices to select the keys for engagement with the punches, substantially as described.

30. In a punching machine, the combination of a punch, a bell-crank lever $A^5$ for the punch having therein a slot $A^{10}$ at one end, and provided at its other end with a lug $m$, a sliding key co-operating with the bell-crank lever and with the punch together with a selecting device for actuating the bell-crank lever, substantially as described.

31. In a punching machine, the combination of punches, a bell crank carrying frame consisting of plates $A'\,A'$ connected by rods with a series of bell cranks $A^5$ for the punches pivoted upon the rods $A^3$, means for selecting the punches by means of the bell-crank levers and a selecting device for actuating the bell crank levers, substantially as described.

32. In a punching machine, the combination of punches, plates $A'\,A'$ with rods $A^2\,A^3$ and $A^4$ connecting the said plates, with slotted vertical plates $A^8$, bell-crank levers working in the slotted plates, means for selecting the punches by means of the bell-crank levers and a selecting device for actuating the bell-crank levers, substantially as described.

33. The combination of gangs of punches $G^9\,G^{10}$ arranged in two rows, together with mechanism for moving the paper through a distance equal to the distance between the rows of punches, and mechanism for returning the paper through a distance equal to one-half the distance between the rows of punches, substantially as described.

34. In a punching machine, the combination with a punch, of a feed carriage, the same consisting of a suitable tension device mounted upon posts $M^3$, uprights $M^5$ carrying rollers $M^8\,M^9$, and rods $M^4$ connecting the posts $M^3$ and the uprights $M^5$, means for actuating the rollers and means for moving the feed carriage, substantially as described.

35. The combination of a moving feed carriage carrying rollers $M^8\,M^9$, one of said rollers having a spur wheel, a lever connected to a stationary part of the machine and having a tooth $m^0$ adapted to engage the spur wheel, means for engaging the tooth with the spur wheel and means for moving the feed carriage, substantially as described.

36. The combination of a moving feed carriage carrying rollers $M^8\,M^9$, one of said rollers having a spur wheel, a lever connected to a stationary part of the machine and having a tooth $m^0$ adapted to engage the spur wheel, means for engaging the tooth with the spur wheel during one movement of the feed carriage, and means for releasing the tooth from the spur wheel and locking the spur wheel from rotation upon the return movement of the feed carriage, substantially as described.

37. The combination with a feed carriage, of rollers $M^8\,M^9$ carried thereby, one of said rollers having a spur wheel, a lever attached to a stationary part of the machine, and having a tooth $m^0$ adapted to engage with the spur wheel, means for reciprocating the feed carriage, means for engaging the tooth with the spur wheel during one movement of the feed carriage, together with a lever having a tooth $m^{00}$ also adapted for engagement with the spur wheel, and means for disengaging the tooth $m^0$ from the spur wheel and for engaging the tooth $m^{00}$ with the spur wheel on the return movement of the feed carriage, whereby the spur wheel is caused to rotate the drum during the forward movement of the feed carriage, and to be locked from rotation on the return movement of the feed carriage, substantially as described.

38. The combination with a roller $M^9$, of a roller $M^8$ carrying a spur wheel, together with means for moving the rollers laterally, a lever attached to a stationary part of the machine, and having a tooth $m^0$ adapted for engagement with the spur wheel, a lever moving with the roller, and having a tooth $m^{00}$ adapted for engagement with the spur wheel, together with means for engaging the tooth $m^0$ with the spur wheel upon the forward movement of the rollers, and means for disengaging the same from the spur wheel on the return movement and for simultaneously engaging the tooth $m^{00}$ with the spur wheel, whereby the paper may be moved a unit distance upon the forward movement of the rollers and returned one half this unit distance on the return movement of the rollers, substantially as described.

39. The combination with a paper carrying frame, of a pair of rollers $M^8\,M^9$ carried thereby, and mechanism for reciprocating the frame, of a lever connected to a stationary part of the frame and having a tooth $m^0$, a lever connected to the frame and moving therewith, and having a tooth $m^{00}$, a link $m^{13}$ connecting the free ends of the levers, and a link $m^{14}$ connected to the link $m^{13}$, and means for moving the link $m^{13}$, substantially as described.

40. The combination in a punching machine, of punches, a selecting drum for the punches, driving mechanism for the drum, means for effecting the connection and disconnection of the drum and its driving mechanism from each other, consisting of a clutch $a^{11}$, a perforated flange $a^7$, a rod $N'$ carrying a ring $n'$, a block carried by the ring, a bolt $a^{10}$ carried by the block and passing through the clutch, and adapted for engagement with the flange $a^7$, and means for reciprocating the rod to engage the bolt with the flange $a^7$, substantially as described.

41. In a punching machine, the combination of a selector, a driving mechanism therefor, means for effecting the connection and disconnection of the selector and its driving mechanism, consisting of a clutch $a^{11}$, a perforated flange $a^7$, a rod $N'$ carrying a ring $n'$, a block carried by the ring, a bolt $a^{10}$ carried by the block and passing through the clutch and adapted for engagement with flange $a^7$, a crank $n^{12}$ pivoted at its center and connected at one end to the rod, and means for rocking the crank to move the rod, whereby the bolt is engaged with its co-operating flange $a^7$, substantially as described.

42. The combination of the end punches $G^9$, sliding keys for engagement with the ends of the same, slotted crank $G^{28}$, rock shaft $G^{29}$, and means for rocking shaft $G^{29}$ and slotted crank $G^{28}$, substantially as described.

43. The combination of end punches $G^9$, sliding keys $A^{12}$, slotted crank $G^{28}$, rock shaft $G^{29}$, crank $G^{30}$, the connection between the crank $G^{30}$ and the main shaft of the machine arranged to rock the crank $G^{30}$ once during two or more revolutions of the main cam shaft, substantially as described.

44. The combination with an end punch $G^9$, means for actuating the same, mechanism for selecting the same for operation, and means for actuating the said selecting mechanism once during two or more revolutions of the main cam shaft, substantially as described.

45. In a punching machine, the combination of punches and selecting mechanism therefor, a grooved upright F, slide $f^{17}$ moving thereon, a measuring mechanism carried by the slide, and a connection between the measuring mechanism and selecting mechanism, substantially as described.

46. In a punching machine, the combination of punches and selecting mechanism therefor, a grooved upright F, slides $f^{14}$, $f^{17}$, moving thereon, a rectangle H carried by the slides, and a connection between the rectangle and the selecting mechanism, substantially as described.

47. In a punching machine, the combination of punches and selecting mechanism therefor, grooved uprights F, slides $f^{14}$ $f^{17}$ moving thereon, measuring devices $G^0$ H secured respectively to the slides on opposite sides and having their free ends working in grooves or ways on the other slide, and connections between each measuring device and a selecting mechanism, substantially as described.

48. The combination of a clutch controlling lever, a pivoted lever $d^{10}$ engaging the same, a cam wheel, a lever therefor, a lever $d^8$ connected to it and engaging the free end of the lever $d^{10}$, and a starting lever cooperating with the lever $d^8$, whereby upon movement of the starting lever the clutch will be thrown into engagement, substantially as described.

49. The combination of a pivoted clutch controlling lever $d^{13}$, a lever $d^{10}$ pivoted intermediate of its ends, and having one end engaging with the lever $d^{13}$, a cam wheel $e^8$ arranged to restore the lever $d^{10}$ when it has been rocked, a lever $d^8$ in engagement with the free end of the lever $d^{10}$, a starting lever and a connection between the starting lever and the lever $d^8$ for causing the same to rock the lever $d^{10}$, substantially as described.

50. The combination with a cam wheel $e^3$, of a clutch lever $d^{13}$, a lever $d^{10}$ engaging the clutch lever, said lever $d^{10}$ being pivoted to one arm of a pivoted bell crank lever $e^{11}$ whose free arm is actuated by the cam wheel, a starting lever, and a connection between the starting lever and the lever $d^{10}$ to rock the same, thereby through the medium of clutch lever $d^{13}$ actuating the clutch, and means for arresting the motion of the cam at a predetermined time, substantially as described.

51. The combination of a main cam shaft $E^3$, a cam wheel $e^8$ mounted thereon, a source of power, a clutch for connecting the source of power with the main cam shaft, a clutch lever $d^{13}$ controlling the clutch, a lever $d^{10}$ controlling the lever $d^{13}$, said lever $d^{10}$ being pivoted intermediate of its ends in a freely swinging bearing, a starting lever and connections between the starting lever and the lever $d^{10}$ for rocking the same to release the clutch lever $d^{13}$ to actuate the clutch, and a connection between the lever $d^{10}$ and the cam wheel $e^8$ for reciprocating the lever $d^{10}$ longitudinally, substantially as described.

52. In a punching machine, the combination of a hand operated gearing for setting the selecting devices for the punches, a power actuated gearing for actuating the punches normally out of operation, means for setting in operation the power actuated gearing for actuating the punches and meantime locking the hand operated gearing from movement, substantially as described.

53. In a punching machine, the combination of punches, a selector, a hand operated gearing for the selector, and power actuated gearing for the punches, a starting lever for starting the power actuated gearing, and a locking device for the hand operated gearing controlled by the power actuated gearing, substantially as described.

54. The combination of a clutch mechanism, a rock shaft $d^7$, a lever $d^8$ connected thereto, a lever $d^{10}$ for actuating the clutch mechanism in engagement with the lever $d^8$, a cam wheel, a lever $e^{13}$ connected to the shaft $d^7$ and having its free end in the cam wheel, a cruciform lever $d^3$ attached to the rock shaft $d^7$ and having means for moving the same, a hand operated gearing, a pawl $i$ for locking the same, and means for actuating the pawl $i$ by means of the cruciform lever $d^3$, substantially as described.

55. In a punching machine, the combination of punches, a plurality of selectors therefor, a driving means for one selector, and means for driving the other selector from the driven selector consisting of a shaft, a disk $b^{25}$ carried upon the shaft, a pin $b^4$ connected to said disk, a disk $b^{21}$ also carried upon the shaft and provided with a recess $b^0$ in proximity to the pin $b^4$ and a lobe $b^{23}$, a shaft $b^8$, a wheel $b^7$ mounted upon the shaft $b^8$ and having hollows cut in its circumference, a wheel $b^6$ joined thereto, having notches $b^5$ in its circumference for co-operation with the pin $b^4$, a wheel $b^9$ also on the shaft $b^8$, a perforated wheel $a^{14}$ co-operating with the wheel $b^9$, a connection between the wheel $a^{14}$ and the selector to be driven consisting of a clutch carrying a movable clutch-bolt $a^{10}$ adapted for engagement with the wheel $a^{14}$, and means for engaging the clutch bolt with the wheel $a^{14}$, substantially as described.

56. In a punching machine, the combination with a main cam shaft, of a hand operated gearing, selecting devices actuated by the hand operated gearing, pawls $i^{12}$ $i^{12}$ for locking the hand operated gearing, and a link connection between the pawls and the main cam shaft for actuating the pawls to lock the hand operated gearing, substantially as described.

57. In a punching machine, the combination of suitable selecting devices, a hand operated gearing for setting the selecting devices, mechanism for locking the hand operated gearing, a power actuated device for actuating the punches, a starting lever for starting the power actuated devices, and a connection between the starting lever and the locking device for the hand operated gearing, whereby upon moving the starting lever the power actuated devices will be set in motion and the hand operated devices will be locked, substantially as described.

58. In a punching machine, the combination with suitable selecting devices, of hand operated gearing for setting the same, a plurality of positioning devices for the hand operated gearing, and mechanism for actuating the positioning devices for the gearing successively, substantially as described.

59. In a punching machine, the combination of suitable selecting devices, hand operated gearing for setting the same, pawls $i'$ $i$ for positioning the same, and means for actuating the pawls successively to position the gearing, substantially as described.

60. In a punching machine, the combination of selecting devices for the punches, gearing for setting the same, pinions forming members of the gearing, pawls $i'$ $i$ for positioning the same, a starting lever having cam surfaces $i^6$ $i^9$ co-operating with the pawls $i'$ $i$ respectively, the cam surface $i^9$ being in advance of the cam surface $i^6$, whereby upon movement of the starting lever the pawl $i$ will be brought into engagement with its wheel before the pawl $i'$ is brought into engagement with its wheel, substantially as described.

61. In a punching machine, the combination of a suitable shaft $j^{15}$, a ratchet secured thereto, a pawl for co-operation with the ratchet to rotate the same, and a roller $M^2$ loosely hung upon the shaft $j^{15}$ and frictionally secured thereto, substantially as described.

62. In a machine of the class described, the combination of punches, a measuring device, adapted to measure distances on the pattern on one line, with a plurality of selectors connected to the measuring mechanism, and co-operating to be jointly actuated from the measuring device to different extents representing portions of the movement of the measuring device with intervening mechanism substantially as described for actuating the plurality of selectors each to an extent corresponding to its respective portion of the movement of the measuring mechanism, as specified.

63. In a machine of the class described, the combination of punches, a measuring mechanism adapted to measure distances on one line on the pattern, and a selecting mechanism with intervening mechanism adapted to connect and disconnect the measuring mechanism and the selecting mechanism, so that the latter may be returned to a normal position, leaving the former in its proper adjustment, substantially as described.

64. In a machine of the class described, a plurality of punches, arranged in parallel rows in separate gang blocks, in combination with a pattern feeding mechanism and mechanism substantially as described for operating the punches, arranged so that after the first row of punches or selected ones of them have made perforations, the feeding mechanism will bring the desired part of the pattern under the second row of punches to have additional perforations made by the latter punches or selected ones of them, substantially as described.

65. In a machine of the class described, the combination of a measuring mechanism, punches, a selector maintained from being displaced bodily, a connection between the selector and the measuring mechanism, consisting of an endless cord passing over pulleys and means for actuating the punches, all arranged so that the measuring mechanism can be moved by operating the endless cord, as specified.

66. In a machine of the class described, a measuring device adapted to measure distances on the pattern on one line, in combination with a plurality of series of punches, which punches represent individually various extents of movement of the measuring mechanism, with connecting and selecting mechanism, intervening between the measuring device and the punches for selecting the punches, all arranged so that one punch may be selected from each series and the combined extents of movement on one line which they represent will equal the extent of movement of the measuring mechanism, substantially as specified.

67. In a machine of the class described, a measuring device adapted to measure distances on the pattern on one line, and a second measuring device adapted to measure distances on the pattern on a line at an angle to the first line, in combination with a plurality of series of punches for each measuring mechanism, which punches represent individually various extents of movement of the measuring mechanisms, with connecting and selecting mechanism, intervening between each measuring device and the punches, all arranged so that a plurality of punches may be selected by each measuring mechanism and means for determining the selection of punches whose combined extents of movement on one line which they represent will equal the extent of movement of the corresponding measuring mechanism, substantially as specified.

68. In a machine of the class described, a measuring mechanism for measuring distances on one line on the pattern, a plurality of series of punches individually representing different extents of motion on the one line, selecting mechanism for the punches, connections between the measuring mechanism and the selecting mechanism, and means for causing the selecting mechanism to select one punch of each series, representing separate portions of the one measurement on the one line, substantially as described.

69. In a machine of the class described, punches arranged in two or more lines in separate gang blocks, adapted to be operated successively and a pattern feeding mechanism substantially as described for moving the pattern in such a manner that the perforations caused by the first and second rows of punches will be in closer proximity than they would be if the punches operated simultaneously, as specified.

70. In a machine of the class described, punches arranged in two or more lines, adapted to be operated successively, and a feed mechanism substantially as described moving the pattern in such a manner that the perforations caused by the first and second rows of punches will be in closer proximity than they would be if the punches operated simultaneously, as specified.

71. In a machine of the class described, the combination of a measuring device for measuring distances on the pattern, a punching mechanism, a selector therefor controlled from the measuring device, and a feeding mechanism substantially as described arranged to feed the pattern during the punching operation so as to cause the punches to perforate the pattern in such a manner that the centers of the perforations will be in closer proximity than the centers of the punches, as specified.

72. In a machine of the class described, the combination of a measuring device for measuring distances on the pattern, a punching mechanism substantially as described adapted to make two successive punching operations to every movement of the measuring device, and mechanism for so operating it, as specified.

73. In a machine of the class described, the combination of a plurality of punches each representing an extent of motion of the measuring device, equal to the complement of portions of one measurement on one line together with one reversing punch, selecting mechanism, a measuring device adapted to measure distances on one line on the pattern and connected with the selecting mechanism, and means for causing the selecting mechanism to select a plurality of punches for operation representing jointly the extent of motion on one line, and a reversing punch to cause the motion due to one punch to be subtracted from the motion due to the other punch.

74. In a machine of the class described, the combination of a plurality of punches representing jointly the extent of movement of the measuring mechanism, together with two reversing punches, selecting mechanism, a measuring device adapted to measure distances on one line on the pattern and connected with the selecting mechanism for the punches, and means for causing the selecting mechanism to select one reversing punch for operation when the movement of the measuring mechanism is opposite to the normal, and causing the other reversing punch to be selected for operation when the lesser extent of movement has to be subtracted from the greater extent of movement so that the combined extent of movements as represented by the plurality of extent punches will equal the extent of movement of the measuring mechanism, substantially as described.

75. In a punching machine, the combination of punches, a measuring mechanism, composite selecting mechanism comprising a plurality of selectors, whereby the selecting mechanism will present a corresponding counterpart of the pattern to be punched and means for moving the selectors with respect to each other from a single measuring mechanism, substantially as described.

76. In a punching machine, the combination of punches, a measuring mechanism, a composite selecting mechanism consisting of a plurality of selecting drums placed in co-operative relation, means for driving one of the drums from the measuring mechanism and means for transmitting motion from the driving drum to another drum, substantially as described.

77. In a punching machine, the combination of a single measuring device for measuring distances on the pattern, punches representing different extents of motion on one line, a selecting mechanism actuated from the measuring device and consisting of a plurality of co-operating selectors movable with respect to each other, the said selectors comprising devices for selecting extent punches and devices for selecting reversing punches, whereby punches may be selected representing two increments of motion, and a punch or punches selected for determining the direction or directions of these motions, substantially as described.

78. In a punching machine, the combination with extent and reversing punches and a measuring device of a plurality of co-operating selectors arranged to be actuated from a single measuring mechanism, each selector operating to select extent punches and one reversing punch, whereby the extent and direction of the motion accruing from each selection may be determined.

JOSEPH A. GROEBLI.

Witnesses:
HARRY M. TURK,
GEO. E. MORSE.